United States Patent
Nilsson et al.

(10) Patent No.: US 12,030,290 B2
(45) Date of Patent: Jul. 9, 2024

(54) BUILDING PANEL COMPRISING MINERAL-BASED LAYER

(71) Applicant: Välinge Innovation AB, Viken (SE)

(72) Inventors: Christoffer Nilsson, Helsingborg (SE); Per Josefsson, Ramlösa (SE); Christian Boo, Kågeröd (SE)

(73) Assignee: Välinge Innovation AB, Viken (SE)

( * ) Notice: Subject to any disclaimer, the term of this patent is extended or adjusted under 35 U.S.C. 154(b) by 0 days.

(21) Appl. No.: 17/345,420

(22) Filed: Jun. 11, 2021

(65) Prior Publication Data

US 2021/0387436 A1 Dec. 16, 2021

(30) Foreign Application Priority Data

Jun. 12, 2020 (SE) .................................. 2050710-9

(51) Int. Cl.
*B32B 3/06* (2006.01)
*B32B 7/12* (2006.01)
(Continued)

(52) U.S. Cl.
CPC .................. *B32B 3/06* (2013.01); *B32B 7/12* (2013.01); *B32B 9/005* (2013.01);
(Continued)

(58) Field of Classification Search
CPC ................ B32B 29/06; B32B 2255/26; B32B 2260/046; B32B 2262/0253; B32B 2262/103; B32B 2264/104; B32B 2274/00; B32B 2307/558; B32B 5/022; B32B 2260/028; B32B 2262/0261; B32B 2262/0276; B32B 9/04; B32B 13/02; B32B 15/18; B32B 27/302; B32B 2262/062;
(Continued)

(56) References Cited

U.S. PATENT DOCUMENTS

| 4,965,299 A | * | 10/1990 | Timm | ................... C04B 18/022 |
| | | | | 524/508 |
| 5,079,078 A | * | 1/1992 | Jutte, Jr. | ................. B32B 13/14 |
| | | | | 428/920 |

(Continued)

FOREIGN PATENT DOCUMENTS

| CN | 105672601 A | 6/2016 |
| CN | 108929100 A | 12/2018 |

(Continued)

OTHER PUBLICATIONS

Office Action and Search Report dated Feb. 5, 2021 in SE Patent Application No. 2050710-9, PRV, Stockholm, SE, 11 pages.
(Continued)

*Primary Examiner* — Brent W Herring
(74) *Attorney, Agent, or Firm* — Boone IP Law

(57) ABSTRACT

A panel, such as a floor panel, including a core, an optional upper arrangement and an optional lower arrangement. One or more of the core, the upper arrangement (5) and the lower arrangement includes a mineral-based layer, preferably including magnesium oxide. One or more of the mineral-based layers includes reinforcement fibres embedded in a mineral-based matrix, preferably including magnesium oxide. The fibres are configured to increase the tensile strength of the mineral-based layer.

27 Claims, 10 Drawing Sheets

(51) Int. Cl.
*B32B 9/00* (2006.01)
*E04F 15/02* (2006.01)
*E04F 15/10* (2006.01)

(52) U.S. Cl.
CPC ...... *E04F 15/02038* (2013.01); *E04F 15/105* (2013.01); *E04F 15/107* (2013.01); *B32B 2419/00* (2013.01); *B32B 2471/00* (2013.01); *E04F 2201/0153* (2013.01); *E04F 2201/023* (2013.01); *E04F 2201/043* (2013.01)

(58) Field of Classification Search
CPC ........ B32B 2262/065; B32B 2262/067; B32B 2262/101; B32B 2262/106; B32B 2307/54; B32B 2607/00; B32B 27/308; B32B 2264/102; B32B 2307/30; B32B 2307/72; B32B 5/024; B32B 21/00; B32B 21/02; B32B 27/32; B32B 27/38; E04F 15/102
USPC ..................................... 52/588.1, 578, 589.1
See application file for complete search history.

(56) References Cited

U.S. PATENT DOCUMENTS

| | | | | |
|---|---|---|---|---|
| 5,358,993 | A * | 10/1994 | Timm | C08L 27/06 524/508 |
| 5,447,752 | A * | 9/1995 | Cobb | B44F 9/04 427/140 |
| 5,508,082 | A * | 4/1996 | Ehrat | C04B 26/02 428/921 |
| 6,641,926 | B1 * | 11/2003 | Malina | B32B 27/302 428/524 |
| 10,167,231 | B1 | 1/2019 | Wambaugh et al. | |
| 10,759,697 | B1 * | 9/2020 | Lukkarila | C04B 18/067 |
| 11,053,696 | B1 * | 7/2021 | Baert | E04B 1/99 |
| 2002/0062625 | A1 * | 5/2002 | Foden | E04F 15/02458 52/794.1 |
| 2004/0126602 | A1 * | 7/2004 | Wallner | C04B 41/52 428/688 |
| 2006/0122305 | A1 | 6/2006 | Lechner | |
| 2007/0207301 | A1 * | 9/2007 | Hanks | B32B 7/12 428/292.1 |
| 2010/0222457 | A1 * | 9/2010 | Wallner | E04F 13/141 524/4 |
| 2016/0264461 | A1 * | 9/2016 | Peng | C04B 41/4876 |
| 2019/0040635 | A1 | 2/2019 | Baert et al. | |
| 2019/0264449 | A1 * | 8/2019 | Welbourn | B32B 27/12 |
| 2019/0379319 | A1 * | 12/2019 | Wambaugh | C04B 14/18 |
| 2020/0063442 | A1 * | 2/2020 | Grafenauer | E04F 15/02038 |
| 2020/0123788 | A1 * | 4/2020 | Baert | B32B 9/045 |
| 2020/0181023 | A1 | 6/2020 | Wambaugh et al. | |
| 2020/0263440 | A1 * | 8/2020 | Chen | B32B 5/022 |
| 2020/0308846 | A1 | 10/2020 | Josefsson et al. | |
| 2021/0002907 | A1 * | 1/2021 | Boucké | E04F 15/02038 |
| 2021/0054619 | A1 * | 2/2021 | Kenny | B32B 13/08 |
| 2021/0238862 | A1 * | 8/2021 | Baert | B32B 13/045 |
| 2021/0355688 | A1 | 11/2021 | Boo | |
| 2021/0388623 | A1 | 12/2021 | Nilsson et al. | |
| 2022/0018140 | A1 * | 1/2022 | Boucké | B32B 3/06 |
| 2022/0074212 | A1 | 3/2022 | Boucké | |
| 2022/0090391 | A1 | 3/2022 | Nilsson | |
| 2022/0251854 | A1 * | 8/2022 | Vermeulen | B32B 13/02 |
| 2022/0396953 | A1 * | 12/2022 | Settels | E04F 15/02038 |

FOREIGN PATENT DOCUMENTS

| | | |
|---|---|---|
| DE | 101 13 060 A1 | 11/2001 |
| KR | 2010-0053816 A | 5/2010 |
| WO | WO 2009/065769 A2 | 5/2009 |
| WO | WO 2009/065769 A3 | 5/2009 |
| WO | WO 2020/114645 A1 | 6/2020 |
| WO | WO 2021/018918 A1 | 2/2021 |

OTHER PUBLICATIONS

International Search Report and Written Opinion dated Aug. 16, 2021 in PCT/SE2021/050565, ISA/SE, Patent-och registreringsverket, 21 pages.
U.S. Appl. No. 18/367,071, filed Sep. 12, 2023, Christoffer Nilsson.
U.S. Appl. No. 18/383,273, filed Oct. 24, 2023, Christian Boo.
U.S. Appl. No. 18/628,988, Per Josefsson, filed Apr. 8, 2024.

* cited by examiner

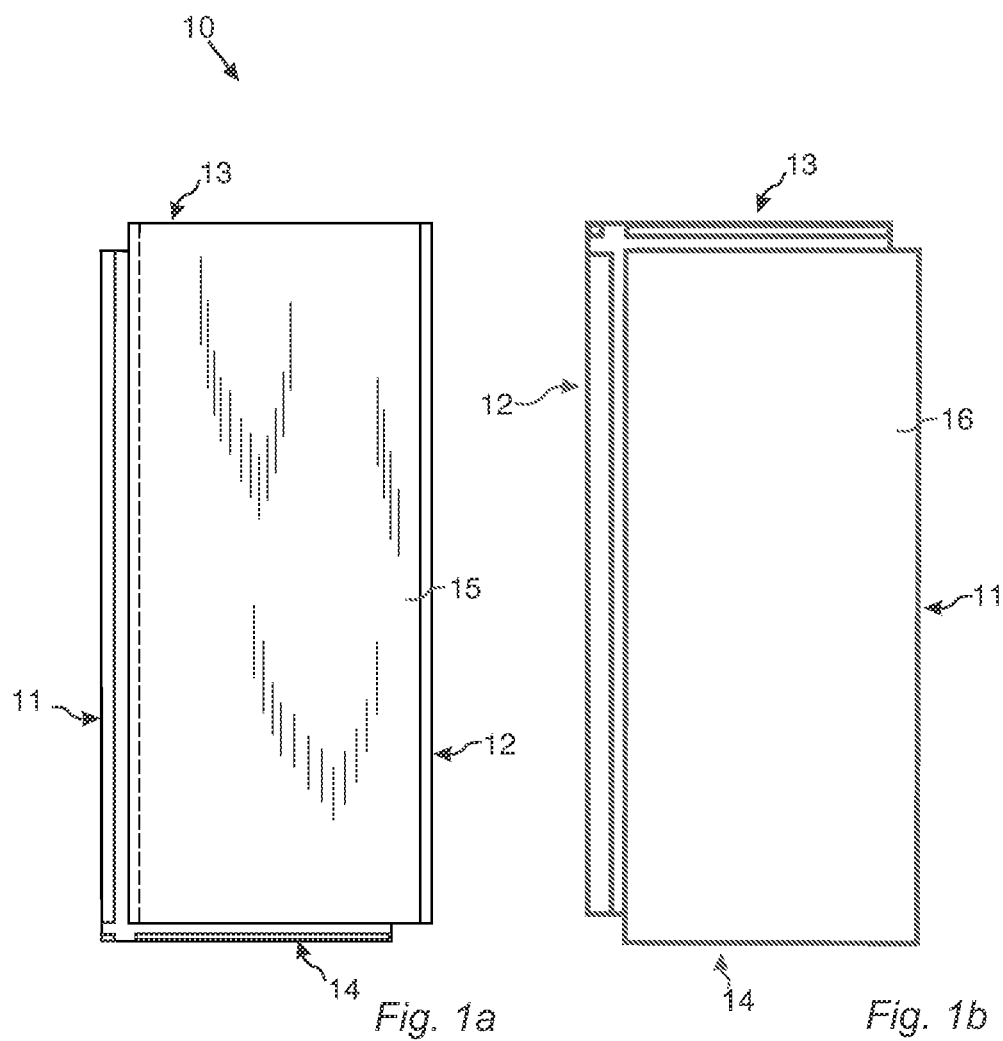
*Fig. 1a*  *Fig. 1b*
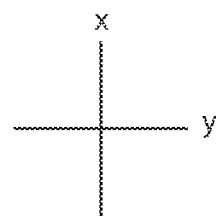

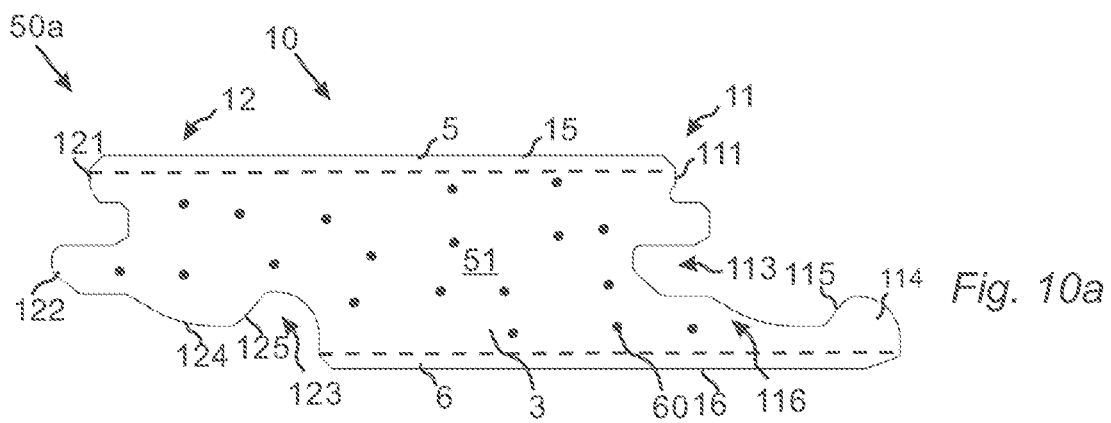
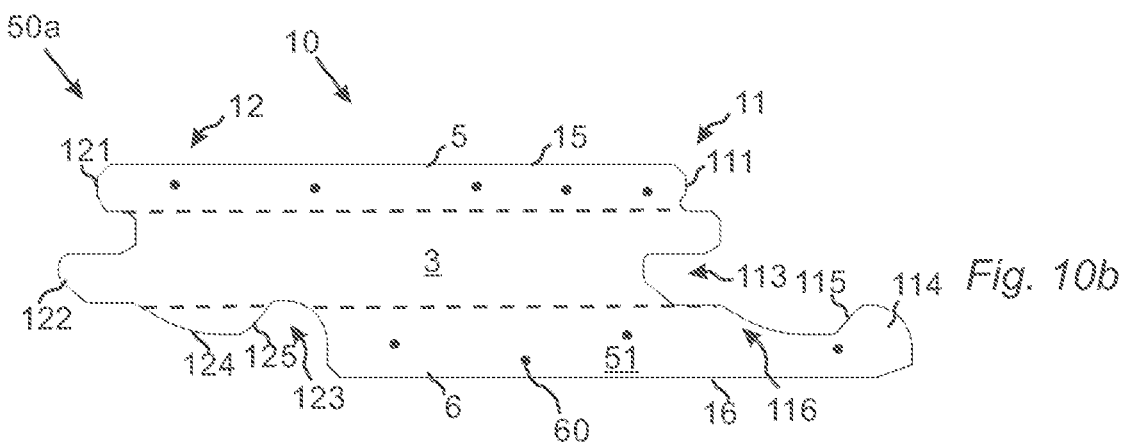

BUILDING PANEL COMPRISING MINERAL-BASED LAYER

CROSS REFERENCE TO RELATED APPLICATIONS

The present application claims the benefit of Swedish Application No. 2050710-9, filed on Jun. 12, 2020. The entire contents of Swedish Application No. 2050710-9 are hereby incorporated herein by reference in their entirety.

TECHNICAL FIELD

The disclosure generally relates to a building panel. More specifically, the disclosure relates to a panel comprising a mineral-based layer. The disclosure also relates to a method of producing such mineral-based layer.

BACKGROUND

There is an increased demand for boards, such as floor boards, that are sustainable and in particular recyclable. There is also a need for fire resistant and water resistant boards, especially those that may maintain or even improve the properties that typically are associated with the boards, such as their dimensional stability under temperature variations of the ambient temperature and/or under moisture variations and, optionally, their flexibility.

Examples of such boards are magnesium oxide boards and cement boards or fibre cement boards. For example, a magnesium oxide board may have a layer structure attached thereto, such as comprising HPL panel.

However, such boards are still typically relatively brittle and there is need for improvements. Moreover, there is need for more robust locking systems for such, and similar, boards.

SUMMARY

It is therefore an object of at least embodiments of the present inventive concept to provide a mineral-based panel having a locking system adapted to the properties of the mineral material.

It is a further object of at least embodiments of the present inventive concept to provide a more flexible panel and/or mineral-based layers.

It is a further object of at least embodiments of the present inventive concept to improve the tensile strength of a panel and/or mineral-based layer.

It is a further object of at least embodiments of the present inventive concept to facilitate ease of forming a mechanical locking system in a mineral-based layer.

At least some of these and other objects and advantages that will be apparent from the description have been achieved by the various aspects described below.

Known locking systems commonly feature biased horizontal locking wherein one or more members of the locking system is resilient or is able to flex or be compressed. Thereby, horizontal locking surfaces may be allowed to overlap during assembling with reduced risk of breaking the lock.

Known panels may also have a horizontal play in a horizontal locking position, however during assembling it functions by one or more members being able to flex or be compressed, as explained above, this is necessary because the locking surfaces overlap during assembling.

In accordance with a first aspect of the inventive concept, there is provided a panel, such as a floor panel, comprising a mineral-based layer which preferably comprises magnesium oxide.

The panel may comprise a mechanical locking system at respective opposite first and second edges, such as long edges, for assembling a first panel in an assembled position with an adjacent second panel by means of a folding displacement and/or a vertical displacement of the adjacent panels. Immediately juxtaposed upper edge portions of the first edge of the first panel and the second edge of the second panel in the assembled position form a vertical plane. The first edge comprising a locking strip projecting beyond the vertical plane and a locking element projecting from the locking strip. The second edge comprising a downwards open locking groove configured to receive the locking element by means of said displacement for horizontal locking of the adjacent panels. A first pair of horizontal locking surfaces comprises a first locking surface provided by the locking element and a second locking surface provided by the locking groove. The locking system is configured such that there is provided play between at least a portion of the first locking surface and at least a portion of the second locking surface during assembling of the first and second panel by means of the displacement. Thereby, flexing and/or compression of the locking element and/or locking strip may be avoided.

In one embodiment, the said play between at least a portion of the first locking surface and at least a portion of the second locking surface during assembling is defined between a predetermined trajectory of a point on the second locking surface and the first locking surface, as will be further elucidated herein.

The locking system may be configured such that there is provided play between at least a portion of the first locking surface and at least a portion of the second locking surfaces in locking position.

In one embodiment, one of the first or second edge may comprise a locking tongue and the other of the first or second edge comprises a tongue groove. The locking system may be configured such that the locking tongue is received in the tongue groove of the second edge by means of a folding displacement and/or a vertical displacement, commonly referred to as vertical folding, of the adjacent second panel, for vertical locking of first edge and the second edge, such as vertical displacement of the second edge of the second panel relative the first edge of the first edge of the first panel.

During said assembling, the upper edge portions may be simultaneously in contact in a first contact point and/or an upper wall portion of the tongue groove and an upper portion of the locking tongue are simultaneously in contact in a second contact point.

In one embodiment, a locking angle may be formed between the first locking surface and a rear surface of the panel, said locking angle preferably measured in a clockwise direction from the plane of the locking surface, the locking angle being in the range of 40 to 60 degrees, preferably 45 to 55 degrees, more preferably 48 to 52 degrees, such as 50 degrees.

In assembled position of the first and second panels, there may be provided a play between the first locking surface and the second locking surface, preferably the play in in the range of 0 to 0.1 mm, for example measured along a horizontal plane.

In one embodiment, the locking angle is adapted to allow assembling by means of said folding displacement without flexing or compression of the locking strip and/or the locking element.

The mineral-based panel may further comprise a lower arrangement comprising one or more layers, and an upper arrangement comprising one or more layers.

In one embodiment, the locking strip is formed in one of a mineral-based layer of the panel or in the core of the panel.

The locking element may be formed as an integral part of the locking strip.

In one embodiment, a point on the second locking surface is displaced along a predetermined or projected trajectory from a first space position to a second space position in response to a folding displacement of the second panel to said assembled position, such as folding of the second panel about the second edge, wherein said predetermined trajectory is disposed on one side, preferably entirely on one side, of a datum plane of the first locking surface during the folding displacement wherein at least one of a first contact point and a second contact point and a third contact point may be in contact.

In one embodiment, the predetermined trajectory forms an arc or a circle having contact point as pivot point.

The first contact point may be between at least a portion of respective upper edge portions of the first and second panel. The second contact point may be between a second pair of vertical locking surfaces.

In accordance with a second aspect there is disclosed a panel, such as a floor panel, comprising a core, an upper arrangement and a lower arrangement, wherein one or more of the core, the upper arrangement and the lower arrangement comprises a mineral-based layer, preferably comprising magnesium oxide.

In one embodiment, one or more of said mineral-based layers comprises reinforcement fibres embedded in a mineral-based matrix, preferably comprising magnesium oxide, wherein the fibres are configured to increase the tensile strength of the mineral-based layer.

The fibres may comprise organic fibres, such as synthetic fibers, such as Polypropylene fibre, Plolyvinylalchohol fibre, Polyester fibre, Nylon fibre or combinations thereof.

In one embodiment, the aspect ratio, such as an average aspect ratio, such as length divided by diameter, of the fibres is in the range of 25 to 700, more preferably 75 to 300.

The fibres may comprise organic fibres, such as natural fibers, such as flax, hemp, bamboo, cotton, wood, sisal, jute, ramie, or combinations thereof.

In one embodiment, the aspect ratio, such as an average aspect ratio, such as length divided by diameter, of the fibres is in the range of 25 to 700, more preferably 100 to 400.

The fibres may comprise inorganic fibers such as glass fibres, carbon fibres, steel fibres or combinations thereof.

In one embodiment, the aspect ratio, such as an average aspect ratio, such as length divided by diameter, of the fibres is in the range of 50 to 2000, more preferably 75 to 1000.

The length of the fibres, such as an average length, is in the range of 3 to 50 mm, more preferably 3 to 25 mm.

In one embodiment, the volume % of fibres in the mineral based layer comprising fibres is in the range of 0.1% to 7%, more preferably 1% to 4%.

The fibres may be provided in shape of non-woven fibres.

In one embodiment, the fibres are arranged in the matrix prior to a step of drying of the mineral-based layer.

The fibres may distributed, such as uniformly distributed, between an upper surface of the mineral-based layer and a lower surface of the mineral-based layer, such as between an upper surface of the core and a lower surface of the core.

In one embodiment, the fibres are oriented to extend essentially parallel the plane of the panel, such as a horizontal plane (H) or a lower surface (16) of the core.

In accordance with a third aspect there is disclosed a panel, such as a floor panel, comprising a core, an upper arrangement and a lower arrangement, wherein one or more of the core, the upper arrangement and the lower arrangement comprises a mineral-based layer, preferably comprising magnesium oxide.

In one embodiment, the mineral-based layer further comprises a polymer compound.

The polymer compound may be based on a chemistry selected from Acrylic, Styrene-Acrylic, Vinyl-acetate, Vinyl-Acetate-vinylchloride, Styrene-Butadiene, vinylidene chloride or combinations thereof.

In one embodiment, the mineral-based layer comprises the polymer compound in an amount of 1 to 15 wt %, more preferably 5 to 10 wt %.

The polymer compound may have a glass transition temperature. The glass transition temperature of the polymer compound may be in the range of −50 to 30° C., more preferably −10 to 20° C.

In one embodiment, the mineral-based layer further comprises magnesium chloride and/or magnesium sulphate.

The mineral-based layer may further comprise at least one filler, such as Perlite, Sand, Talc, Fly ash, Calcium Carbonate or combinations thereof in an amount of 0 to 50 wt %, such as 5 to 45 wt %, for example 10-40 wt %.

In one embodiment, the mineral-based layer further comprises a binding agent, such as wood shavings or wood fibres, in an amount of 0 to 30 wt %, such as 5-25 wt %.

The mineral-based layer may further comprise at least one additive, such as defoaming agent, dispersing agent, anti-corrosion agent, water resistance additive of combinations thereof, in an amount of 0 to 20 wt %, such as 2-15 wt %.

Any of the aspects disclosed herein may comprise any of the following embodiments:

In one embodiment, one or more of the core and the mineral-based layer comprises non-hydraulic cement, preferably magnesium oxide, and optionally magnesium chloride, such as $MgCl_2$ and/or magnesium sulphate, such as $MgSO_4$.

The panel may comprise a front side and a rear side. The front side may be a visible side of the panel and the rear side may be concealed in an installed state of the panel, such as facing a subfloor, a subroof or a subwall.

A thickness of the panel may be 2-40 mm, such as 4-12 mm or 2-10 mm. For example, a floor panel may have a thickness of 2-10 mm. A groove length of each groove may be larger than 5 mm, preferably larger than 50 mm.

The mineral-based layer may be a cementitious panel comprising cement. For example, the mineral-based core, or core for short, may be a cementitious core.

The mineral-based layer or core may comprise non-hydraulic cement. The non-hydraulic cement may comprise magnesium oxide, and optionally magnesium chloride (e.g. $MgCl_2$) and/or magnesium sulphate (e.g. $MgSO_4$). For example, the non-hydraulic cement may comprise or may be Sorel cement.

The mineral-based layer may comprise hydraulic cement. The hydraulic cement may comprise silicates, such as calcium silicates, and optionally oxides. For example, the cement may be fibre cement, such as comprising or being Portland cement.

The mineral-based layer may comprise magnesium oxide and, optionally, magnesium chloride and/or magnesium sulphate.

The mineral-based layer may comprise gypsum or may be a gypsum board. This may be particularly advantageous for a wall panel or a ceiling panel.

The mineral-based layer may comprise an inorganic matrix material. For example, the inorganic matrix material may comprise magnesium oxide, cement, such as hydraulic or non-hydraulic cement, or gypsum, preferably in an amount of at least 20 wt %, such as at least 30 wt %.

Generally, the mineral-based layer may further comprise at least one selected from the group of a filler, such as an organic and/or inorganic filler, additive(s) and a binding agent. The filler may be a functional filler. For example, the functional filler may reinforce the core, improve the bonding to a, preferably inorganic, matrix material of the core, increase a rigidity of the core, etc.

The mineral-based layer may comprise organic material, such as at least one selected from the group of wood fibres, cellulose fibres, natural fibres, carbon fibres, and bamboo.

The mineral-based layer may comprise inorganic material, such as calcium carbonate, fly ash, silica, or perlite.

The mineral-based layer may comprise cement.

In any embodiment herein, one or more of the core 3, a mineral-based layer of the upper arrangement 5, a mineral-based layer of the lower arrangement 6 may comprise at least 30 wt % magnesium oxide, and, optionally, magnesium chloride and/or magnesium sulphate. For example, the core 3 may comprise 35-55 wt % magnesium oxide and, optionally, 15-35 wt % magnesium chloride and/or magnesium sulphate. Optionally, the core may further comprise a filler, such as fly ash or calcium carbonate, preferably in an amount of 0-40 wt %, and/or a binding agent, such as wood shavings or wood dust, preferably in an amount of 0-10 wt %. More generally, the core 3 may comprise an inorganic matrix material, preferably with at least 20 wt % of an inorganic matrix material, such as cement, such as hydraulic or non-hydraulic cement, or gypsum.

The mineral-based layer may comprise reinforcing material, such as fibre reinforcement. The fibre reinforcement may be organic, such as comprising cellulose fibres or wood fibres, or inorganic, such as comprising glass fibres.

The mineral-based layer may be a cement board, such as a fibre cement board.

Generally, a density of the mineral-based layer, for example comprising magnesium oxide or cement, may be between 1000 and 2000 kg/m$^3$, such as between 1200 and 1700 kg/m$^3$. A larger density may provide a larger rigidity and/or a larger flexural rigidity of the layer.

The mineral-based layer may further comprise a lower arrangement comprising at least one lower layer which is attached to a lower side of the mineral-based core.

At least two lower layers may be attached together by means of an adhesive or may be laminated together, or a combination thereof. The adhesive may be compatible with the materials of the attached layers.

In a first example, the lower arrangement may be attached to the core by means of an adhesive. In a second example, the lower arrangement may be laminated to the core.

The lower arrangement may comprise a backing layer, which preferably is a bottommost layer of the lower arrangement. The backing layer may impact the balancing properties and/or the stability of the panel.

The material content of any, some or each lower layer may be the same as in the core, whereby reference is made to the above.

In any of the embodiments herein, a density of at least one lower layer, such as all lower layers, in the lower arrangement may be larger than a density of the mineral-based core. Generally, the density may be between 1100 and 2100 kg/m$^3$, such as between 1300 and 1400 kg/m$^3$.

At least one lower layer in the lower arrangement, such as all lower layers, may comprise magnesium oxide and, optionally, magnesium chloride and/or magnesium sulphate. Each such lower layer may comprise an inorganic matrix material. For example, the inorganic matrix material may comprise magnesium oxide, cement, such as hydraulic or non-hydraulic cement, or gypsum, preferably in an amount of at least 20 wt %, such as at least 30 wt %.

At least one lower layer in the lower arrangement, such as all lower layers, may comprise cement.

The at least one lower layer may be a cement board, such as a fibre cement board.

The lower arrangement may comprise at least one polymer-based layer, such as at least one thermoplastic layer, for example comprising polyvinyl chloride (PVC), polyethylene (PE), thermoplastic polyurethane (TPU), polypropylene (PP), polyethylene terephthalate (PET), polyolefin copolymers or acrylonitrile butadiene styrene (ABS), or at least one thermosetting layer, for example comprising a melamine-formaldehyde resin, or melamine resin for short, epoxy resin, preferably crosslinked with an amine hardener, polyurethane (PU), polyurea or acrylate polymers.

The lower arrangement may comprise at least one wood-based layer or cellulose-based layer, such as a veneer, paper, such as impregnated paper, preferably paper impregnated with a melamine resin, solid wood layer, MDF layer, HDF layer, layer of Direct Pressure Laminate (DPL) or High Pressure Laminate (HPL), or particle board layer.

The mineral-based panel may further comprise an upper arrangement comprising at least one upper layer and which is attached to an upper side of the mineral-based core.

At least two upper layers may be attached together by means of an adhesive or may be laminated together, or a combination thereof. The adhesive may be compatible with the materials of the attached layers.

In a first example, the upper arrangement may be attached to the core by means of an adhesive. In a second example, the upper arrangement may be laminated to the core.

In any of the embodiments and examples herein, the adhesive attaching a first structure to a second structure, may be a polyurethane, silane-terminated epoxy resin, or silane-terminated polyurethane. Any of these may be two-component. Moreover, the adhesive may be a non-reactive or reactive hot-melt adhesive, for example being based on polyurethane or polyolefin. More generally, the adhesive may be a two-component adhesive. Preferably, the adhesive is moisture resistant and/or heat resistant.

The material content of any, some or each upper layer may be the same as in the mineral-based layer, whereby reference is made to the above.

In any of the embodiments herein, a density of at least one upper layer, such as all upper layers, in the upper arrangement may be larger than a density of the mineral-based core. Generally, the density may be between 1100 and 2100 kg/m$^3$, such as between 1300 and 1400 kg/m$^3$.

At least one upper layer in the upper arrangement, such as all upper layers, may comprise magnesium oxide and, optionally, magnesium chloride and/or magnesium sulphate. Each such upper layer may comprise an inorganic matrix material. For example, the inorganic matrix material may comprise magnesium oxide, cement, such as hydraulic or non-hydraulic cement, or gypsum, preferably in an amount of at least 20 wt %, such as at least 30 wt %.

At least one upper layer in the upper arrangement, such as all upper layers, may comprise cement.

The at least one upper layer may be a cement board, such as a fibre cement board.

The upper arrangement may comprise at least one polymer-based layer, such as at least one thermoplastic layer, for example comprising PVC, PE, TPU, PP, PET or ABS, or at least one thermosetting layer, for example comprising a melamine-formaldehyde resin, epoxy resin, preferably crosslinked with an amine hardener, PU, polyurea or acrylate polymers.

The upper arrangement may comprise at least one wood-based layer or cellulose-based layer, such as a veneer, paper, such as impregnated paper, preferably paper impregnated with a melamine resin, solid wood layer, MDF layer, HDF layer, or particle board layer.

The at least one polymer-based layer of the upper and/or lower arrangement(s) may comprise plasticized and/or flexible layer(s), such as being a Luxury Vinyl Tile (LVT) panel or an LVT sheet. Alternatively, the at least one polymer-based layer of the upper and/or lower arrangement(s) may comprise rigid layer(s), such as being a Stone Plastic (Polymer) Composite (SPC) panel or an SPC sheet.

The at least one polymer-based layer of the upper and/or lower arrangement(s) may be a powder-based layer comprising a thermosetting resin, optionally further comprising at least one veneer layer.

The at least one wood-based or cellulose-based layer of the upper and/or lower arrangement(s) may be a high-pressure laminate (HPL) panel.

The at least one wood-based or cellulose-based layer of the upper and/or lower arrangement(s) may be a powder-based separate surface layer (SSL) as described in WO 2009/065769 A2. For example, the SSL layer may have a thickness of about 0.3-3.0 mm. The surface layer may have a high density and impact resistance even if it is combined with rather soft core materials.

In some embodiments, the upper arrangement may comprise at least one ceramic tile, for example attached to a carrier layer of the upper arrangement or to the core by an adhesive.

The upper arrangement and/or the lower arrangement(s) may be rigid. For example, the upper arrangement and/or the lower arrangement(s) may be more rigid than the core.

At least one upper and/or lower layer may comprise a filler. The filler may be a filler, such as a functional filler, in complete analogy with any of the embodiments of the filler of the core described elsewhere herein.

The upper arrangement and/or the lower arrangement(s) may be soft. For example, the upper arrangement and/or the lower arrangement may be softer than the core. In any embodiment of the upper and/or lower arrangement(s), any, some or all lower and/or upper layer(s) may comprise a plasticizer. This may be particularly relevant for thermoplastic layers. If so, an adhesive which is compatible with a plasticizer may be preferred.

The mineral-based panel may further comprise at least one reinforcement layer, such as a glass-fibre layer. Generally, at least one woven or nonwoven reinforcement layer may be used.

The at least one reinforcement layer may be a metal-based layer, such as a mesh, for example comprising steel. This may be particularly advantageous for a panel, such as a core, comprising cement.

The at least one reinforcement layer may be provided in the mineral-based core, for example in a centre portion of the core.

At least one reinforcement layer may be positioned in a top portion and/or a bottom portion of the mineral-based core. In a first example, at least one reinforcement layer may be positioned a distance from an upper and/or a lower side of the core which is less than $\frac{1}{6}$, preferably less than $\frac{1}{8}$, more preferably less than $\frac{1}{16}$, of a thickness of the core. In a second example, at least one reinforcement layer may be positioned a distance from an upper and/or a lower side of the core which is less than 2 mm, such as less than 1 mm. A thickness of the core may be 2-40 mm, such as 4-12 mm or 2-10 mm. In a third example, at least one reinforcement layer may be positioned essentially at the upper and/or lower side of the core.

It should be appreciated that two or more of the first aspect, the second aspect and the third aspect may advantageously be combined to yield synergistic effects.

In accordance with a fourth aspect of the inventive concept, there is provided a set of panels comprising a plurality of panels in accordance with any of the embodiments or examples of the first aspect or the second aspect or the third aspect or combinations thereof.

In accordance with a fifth aspect, there is disclosed a method of producing a mineral-based layer. The method comprising a step of mixing water, magnesium oxide, and optionally magnesium chloride or magnesium sulphate with a filler component to form a slurry; adding a polymer compound to said slurry; optionally adding reinforcement fibres according to any embodiment disclosed herein; drying the slurry to form a mineral-based layer or mineral-based board.

In one embodiment the filler component comprises Perlite, Sand, Talc, Fly ash, Calcium Carbonate or combinations thereof.

The method may further comprise a step of adding a de-foaming agent, a dispersing agent, an anti-corrosion agent, a water resistance additive.

In one embodiment the polymer compound is present in the amount 1 to 15 wt %, more preferably 5 to 10 wt % of the mineral-based layer.

The polymer compound may be based on a chemistry selected from: Acrylic, Styrene-Acrylic, Vinyl-acetate, Vinyl-Acetate-vinylchloride, Styrene-Butadiene, vinylidene chloride or combinations thereof.

In one embodiment, the polymer compound is added in the form of a powder or a dispersion, such as a water dispersion, for example the polymer compound in the form of a powder dispersed in water.

Accordingly, the polymer compound may be added in the form of a dispersion, wherein the pH-value of the polymer dispersion is pH 7 or more.

In one embodiment, the method further comprises a step of adding reinforcement fibres comprising reinforcement fibres according to any one of items 2 to 14.

In accordance with a sixth aspect, there is disclosed the use of a polymer compound, such as a polymer compound according to any embodiment of the third aspect, in a mineral-based layer of a building panel, such as a floor panel.

In accordance with a seventh aspect, there is disclosed the use of reinforcement fibres, such as fibres according to any embodiment of the second aspect, in a mineral-based layer of a building panel, such as a floor panel.

Further embodiments being provided in the description and the appended claims and items section to which reference is made.

Generally, all terms used in the claims and in the items in the embodiment section below are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

BRIEF DESCRIPTION OF THE DRAWINGS

The disclosure will in the following be described in connection to exemplary embodiments and in greater detail with reference to the appended exemplary drawings, wherein:

FIGS. 1a-1b schematically illustrate embodiments of a panel in a top view and in a bottom view.

FIG. 4b illustrates detail B of a folding displacement of the embodiment of FIG. 4a.

FIG. 5a illustrates detail D of the embodiment of FIG. 4a.

FIG. 5b illustrates detail C of the embodiment of FIG. 4a.

FIG. 6b illustrates detail A of the embodiment of FIG. 6a.

FIG. 6c illustrates detail C of the embodiment of FIG. 6a.

FIG. 6d illustrates detail B of the embodiment of FIG. 6a.

FIG. 7b illustrates detail N of a folding displacement of the embodiment of FIG. 7a.

FIGS. 10a-10b illustrate exemplary embodiments of the third aspect.

DETAILED DESCRIPTION

Figure 2A:
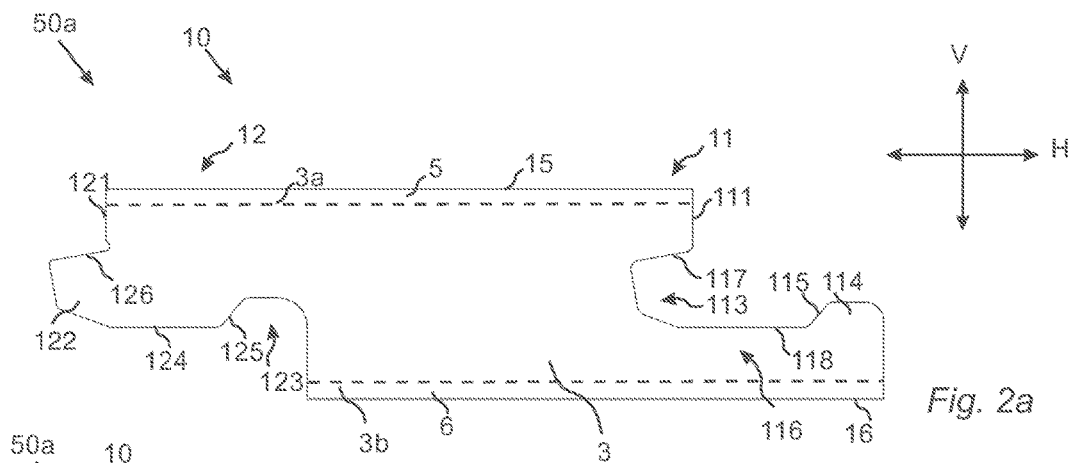
FIG. 2a illustrates an embodiment of a panel in a cross-sectional view.

Below, embodiments of the mineral-based panel 10 will mostly be described in the context of a floor panel, but it is understood that the panel also may be a building panel, a wall panel, a ceiling panel or a furniture panel.

FIG. 1a-1b show an exemplary panel according to the disclosure. Generally herein, the panel may extend in a first horizontal direction x and in a perpendicular second horizontal direction y. Moreover, the panel may extend in a vertical direction z which may be perpendicular to the first and second horizontal directions. The panel 1 may comprise a first pair of opposite edge portions 11, 12, which may be long edge portions, and a second pair of opposite edge portions 13, 14, which may be short edge portions. The long edge portions may extend along the first horizontal direction x and the short edge portions may extend along the second horizontal direction y.

The panel in any of the embodiments in FIGS. 1a-1b may comprise a locking system 50a on the first pair 11, 12 of opposite edge portions. The locking system may comprise a tongue 122 and a tongue groove 113 on the respective edge portion for vertical locking. For example, the tongue and tongue groove may be integrally formed with the panel. The locking system may further comprise a locking groove 123 and a locking element 114 on the respective edge portion for horizontal locking. The locking element is preferably provided on a strip 116 extending horizontally beyond an upper portion of the panel 10. It should be appreciated that the locking systems 50a may be provided at any pair of opposite edge portion, such as long edges and/or short edges.

The core 3 may be mineral-based and comprise reinforcing material, such as fibre reinforcement. The fibre reinforcement may be organic, such as comprising cellulose fibres or wood fibres, or inorganic, such as comprising glass fibres.

The mineral-based panel may further comprise a lower arrangement 6 comprising at least one lower layer which is attached to a lower side of the core 3. The lower arrangement may comprise a mineral-based layer.

The mineral-based panel may further comprise an upper arrangement 5 comprising at least one lower layer which is attached to a lower side of the mineral-based core. The upper arrangement may comprise a mineral-based layer.

The composition of the mineral-based layer of the lower arrangement may be the same or different as the composition of the mineral-based layer of the upper arrangement. Moreover, the composition of the mineral-based layer of the lower arrangement may be the same or different as the composition of a mineral-based core. Similarly, the composition of the mineral-based layer of the upper arrangement may be the same or different as the composition of a mineral-based core.

Figure 2B:
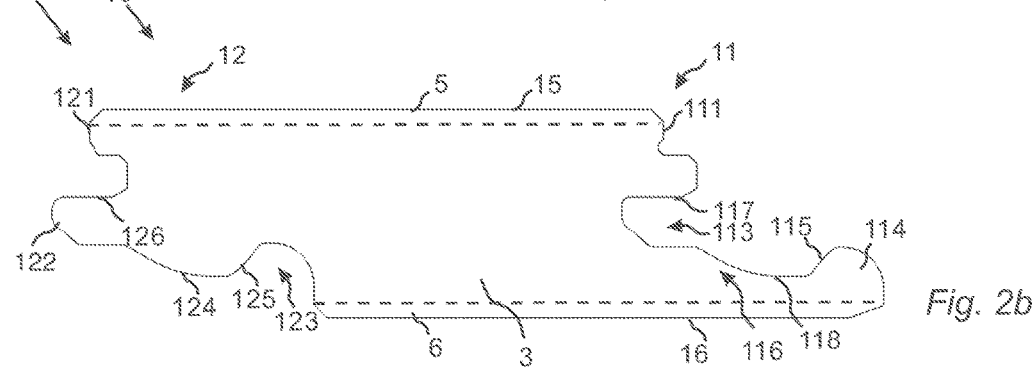
FIG. 2b illustrates an embodiment of a panel in a cross-sectional view.
Figure 3:
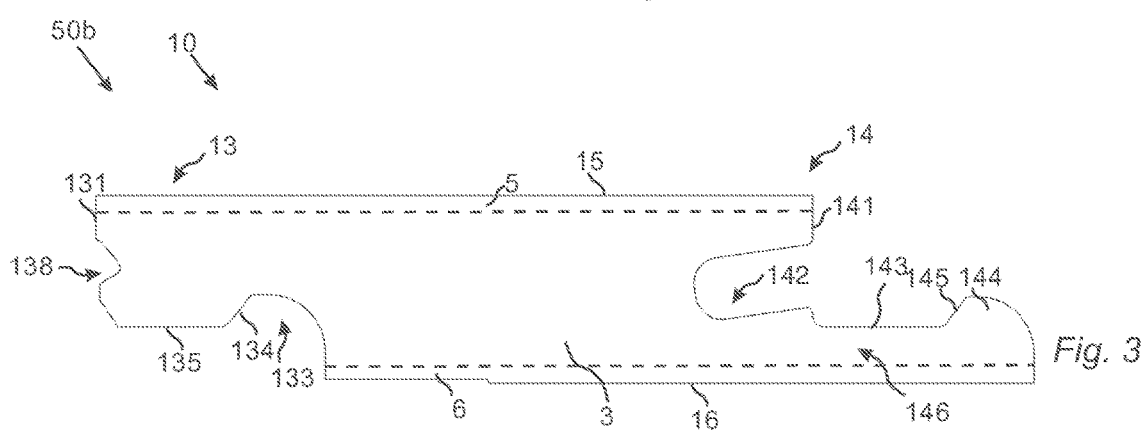
FIG. 3 illustrates an embodiment of a panel in a cross-sectional view.
Figure 8A:
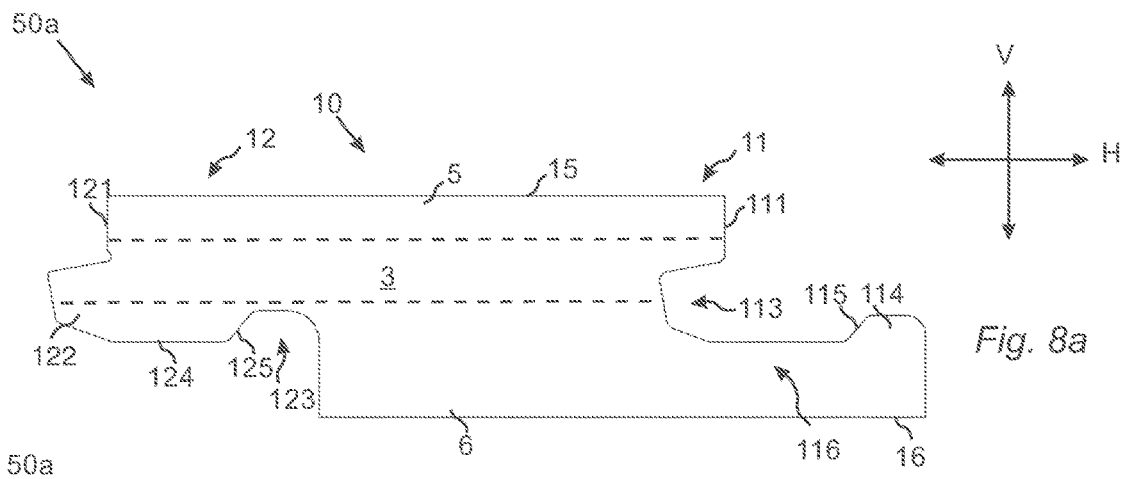
FIG. 8a is schematic illustration of an embodiment corresponding to FIG. 2a wherein the locking system is at least partially formed in a mineral-based layer.
Figure 8B:
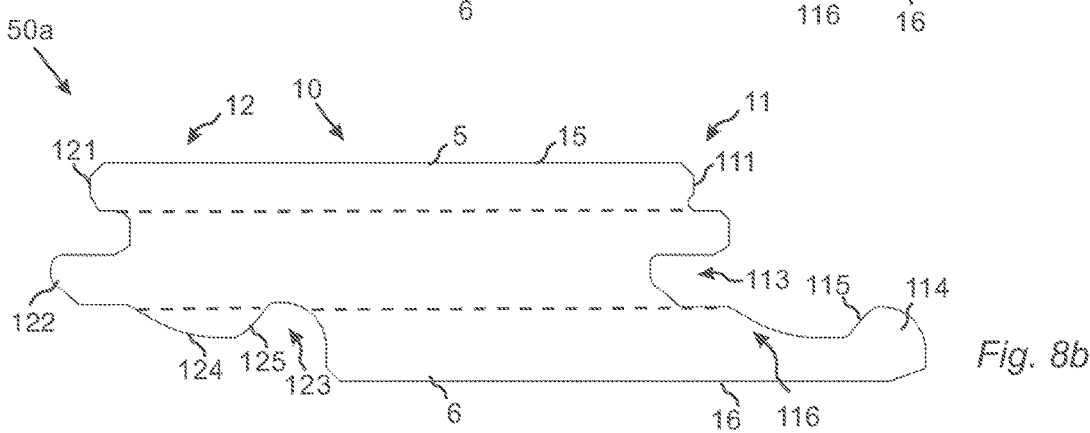
FIG. 8b is schematic illustration of an embodiment corresponding to FIG. 2b wherein the locking system is at least partially formed in a mineral-based layer.
Figure 8C:
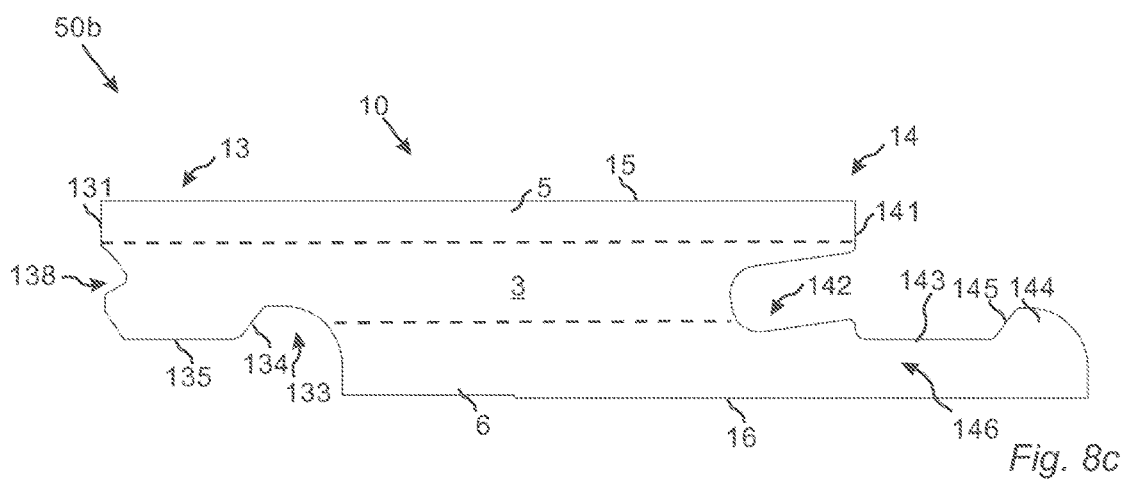
FIG. 8c is schematic illustration of an embodiment corresponding to FIG. 3 wherein the locking system is at least partially formed in a mineral-based layer.

The locking system 50a, 50b may be at least partially formed in the core 3 between the upper arrangement 5 and the lower arrangement 6, as shown in FIGS. 2a-2b and 3. In particular, a first and second pair of horizontal locking surfaces 111, 121 and 125, 115, respectively, may be formed in the core 3, for example by means of machining, such as rotating tools. Alternatively or additionally, at least part of the locking system 50a, 50b may be formed in a mineral-based layer of the upper arrangement 5 and the lower arrangement 6, as schematically shown in the embodiments of FIGS. 8a-8c. In particular, the second pair of horizontal locking surfaces 125, 115 may be formed in such mineral-based layer. For example, a portion of the locking strip 116 including the upper surface 118 of the locking strip and the locking element 114 may be formed in a mineral-based layer, such as the core or a mineral-based layer of the lower-arrangement 6. For example, the first locking tongue 122 and the first tongue groove 113 may be formed in a mineral-based layer, such as the core 3 or a mineral-based layer of the upper-arrangement 5. In a still further example, the second tongue groove 138 and at least part of the displacement groove 142 may be formed in a mineral-based layer, such as the core 3 or a mineral-based layer of the upper-arrangement 5.

Figure 6A:
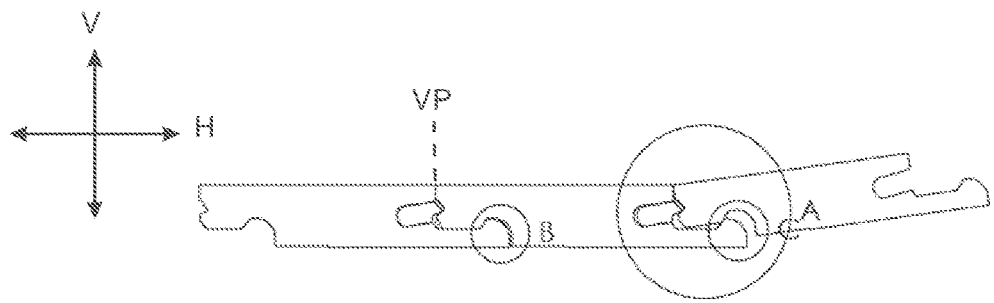
FIG. 6a illustrates an exemplary assembling process of a set of panels according to the embodiment of FIG. 3.
Figure 6B:
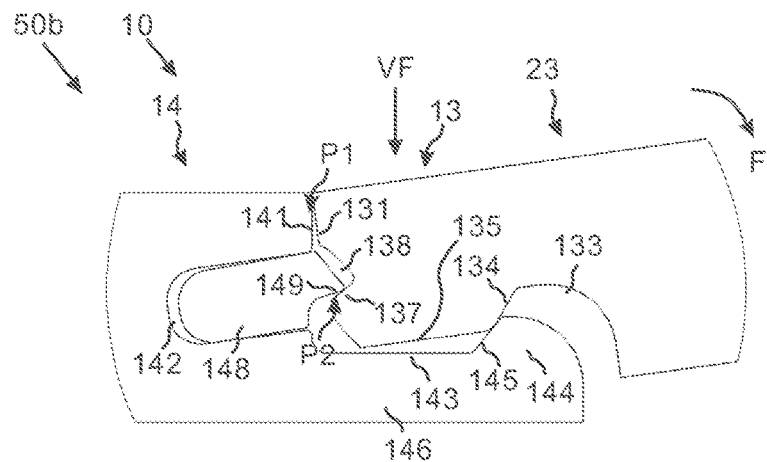
Figure 6C:
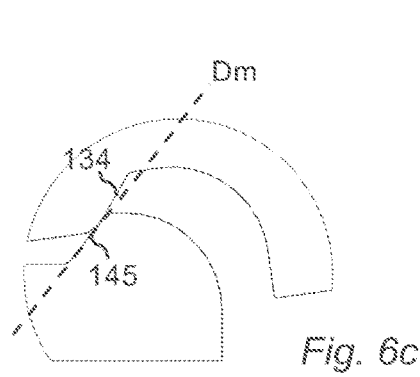

Alternatively, or additionally, any of the panels in FIGS. 1a-1b may comprise a locking system 50b on the second pair 13, 14 of opposite edge portions. The locking system may comprise a tongue 142 and a tongue groove 138 on the respective edge portion for vertical locking. For example, and as shown in FIG. 6b, the tongue 148 may be a separate locking tongue 148 provided in a displacement groove 142, preferably providing a fold down locking system. The locking system 50b may be configured for assembling of panels by means of a folding displacement and/or a vertical displacement. FIG. 6b shows a folding displacement. A non-limiting embodiment of a separate locking tongue 142 is illustrated in FIG. 6b in a cross-sectional top view. This so-called bristle tongue is preferably formed in one-piece and comprises flexible protrusions. The locking system 50b may further comprise a locking groove 133 and a locking element 144 on the respective edge portion for horizontal locking. The locking element is preferably provided on a strip 146 extending horizontally beyond an upper edge portion 141 of the fourth edge of the panel 10. The locking groove 133 is preferably provided inboard of an upper edge portion 131 of the third edge 13 of the panel 10. Thus, it should be appreciated that the locking systems 50b may be provided at any pair of opposite edge portion, such as long edges and/or short edges.

Any horizontal locking system may comprise a locking element and a locking groove, and/or any vertical locking system may comprise a tongue and a tongue groove. Alternatively, or additionally, the locking element and locking groove may comprise vertical locking surfaces configured to cooperate for vertical locking. In a first example, the tongue is integrally formed with the panel, preferably with the core. This is conceivable on a long and/or a short edge portion. In a second example, and as preferred on a short edge portion, the tongue is separately formed from the panel, and may be provided in a displacement groove 142 provided in the panel, preferably in the core 3.

A horizontal extension of the tongue 122, 148 from a vertical plane VP may be smaller than an extension of the strip 116, 146 from a vertical plane VP. A horizontal extension of the respective tongue groove 113, 138 may be substantially the same as the extension of the respective tongue 122, 148.

Referring to FIGS. 2a-2b and 3 there is illustrated exemplary embodiments of a panel 10 according to the disclosure. The panel comprises a mineral-based core 3, preferably comprising magnesium oxide, as has been explained herein.

Figure 4A:
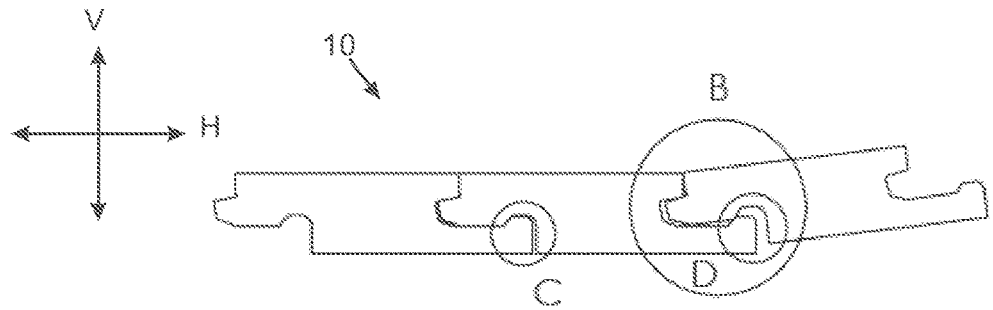
FIG. 4a illustrates an exemplary assembling process of a set of panels of FIG. 2a according to an embodiment.
Figure 4B:
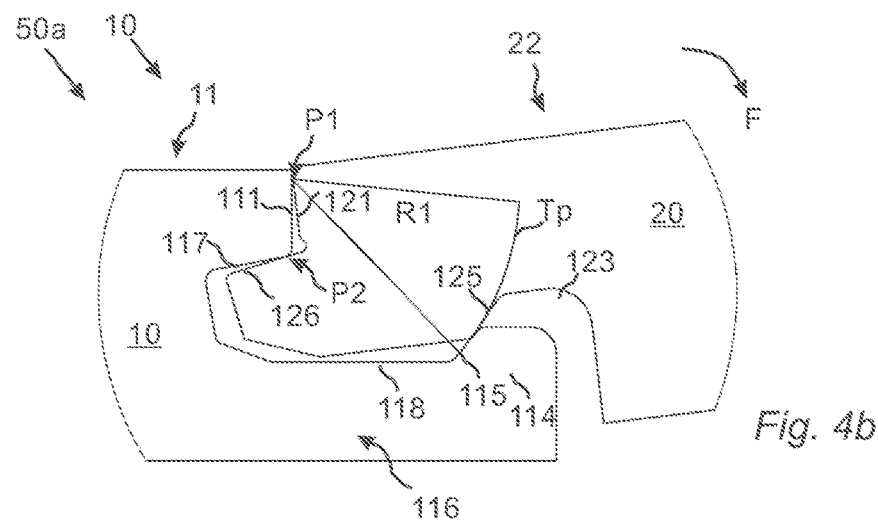
Figure 4C:
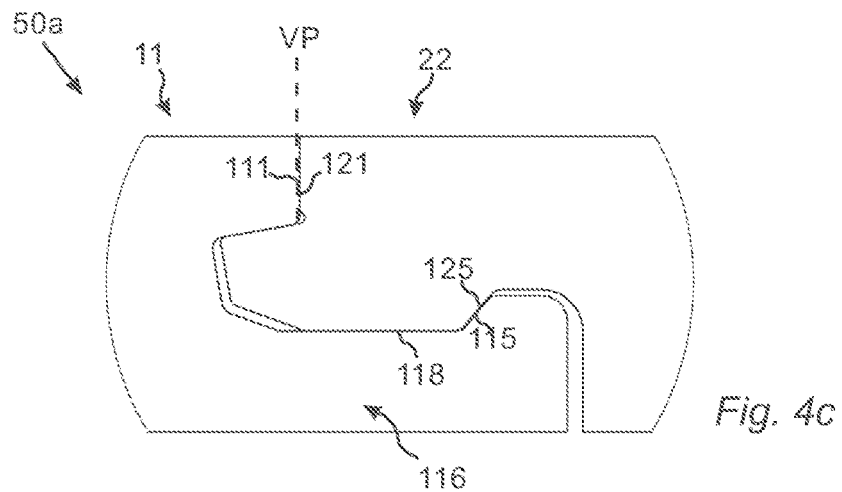
FIG. 4c illustrates of details of the embodiment of FIG. 4b in locking position.

The panel comprises a mechanical locking system, such as 50a or 50b at respective opposite first 11 and second 12 edges, such as long edges, for assembling a first panel 10 in an assembled position with an adjacent second panel 20 by means of a folding F displacement, as illustrated in FIG. 4a-4c.

The first edge 11 may comprise the locking strip 116 projecting beyond the vertical plane VP.

As illustrated e.g. in FIG. 4c, the strip 116 may extend from vertical plane VP defined by immediately juxtaposed upper portions 111, 121 of two neighboring joint edge portions of two joined panels, such as the first edge 11 of the first panel 10 and the second edge 22 of the second panel 20. The strip may be a strip at a short edge portion and/or at a long edge portion. Optionally, the strip may comprise a lower panel portion provided below the tongue groove.

The horizontal portion may extend along a first and/or a second horizontal direction of the mineral-based panel and may have a vertical extension, such as extending from a rear side 16 of the panel to an upper surface of the strip 118, 143.

The strip 116 may comprise a locking element 114, 144. Preferably, the horizontal portion is at least provided horizontally inwardly of the locking element.

The horizontal portion may comprise the entire strip, preferably including a locking element.

The locking element 114 may comprise a portion of the mineral-based core, such as at a distal end portion of the locking element. The distal end portion may be a vertical distal end portion.

A horizontal and/or a vertical locking surface may be provided in the core 3.

The strip may extend horizontally beyond an upper portion 111, 112 of the mineral-based panel.

At least a horizontal portion of the strip may be formed in the core 3.

A locking element 114 projects from the locking strip 116, such as in a direction perpendicular the locking strip 116.

The horizontal portion may at least be provided horizontally inwardly of the locking element 114.

The horizontal portion may comprise the entire strip, preferably including the locking element 114.

The second edge 12 comprises a downwards open locking groove 123 configured to receive the locking element 114 by means of said displacement for horizontal locking of the adjacent panels.

Generally, a locking surface may be configured to lock two adjacent panels in one direction. Therefore, the horizontal and vertical locking system preferably comprises at least a pair of horizontal locking surfaces and at least a pair of vertical locking surfaces be configured to lock two adjacent panels in two opposite horizontal and vertical directions, respectively. In some embodiments, the horizontal and vertical locking surfaces may be provided by a common, preferably inclined, surface.

In the locking systems 50a, 50b, a respective first pair of horizontal locking surfaces 115, 125 and 145, 134 comprises a first locking surface 115, 145 provided by the locking element 114, 144 a second locking surface 125, 134 provided by the locking groove 123, 133.

A respective second pair of horizontal locking surfaces 111, 121 and 131, 141 comprises an upper edge portion 111, 131 of the first or third edge and an upper edge portion 121, 141 of the second edge 12 and fourth edge 14.

In the embodiment of FIGS. 2 and 4b, a first pair of vertical locking surfaces may comprise an upper surface portion 126 of the locking tongue 122 and an upper wall surface portion 117 of the tongue groove 113.

In the embodiment of FIGS. 3 and 6b, a first pair of vertical locking surfaces may comprise a lower surface portion 149 of the locking tongue 148 and a lower wall surface portion 137 of the tongue groove 138.

A second pair of vertical locking surfaces may comprise lower surfaces 124, 135 of the first edge 11 and third edge 13 respectively and upper surfaces 118, 143 of the locking strips 116, 146.

As shown in FIGS. 4b and 6b, a first contact point P1 may be defined in the locking system 50a as between the second pair of horizontal locking surfaces, such as an upper edge portion 111 of the first edge 11 of the first panel 10 and an upper edge portion 121 of the of the second panel 20. Alternatively, between the second pair of horizontal locking surfaces of locking system 50*b*, such as an upper edge portion 141 of the fourth edge 14 of the first panel 10 and an upper edge portion 131 of the of the third edge 23 of a second panel 20.

A second contact point P2 may be defined in the locking system 50*a* or 50*b* as between the first pair of vertical locking surfaces 117, 126 and 149, 137 respectively, such as a surface of an upper wall portion 117 of the tongue groove 123 of the first panel 10 and an upper surface portion 126 of the locking tongue 122 of the second panel 20.

Figure 7A:
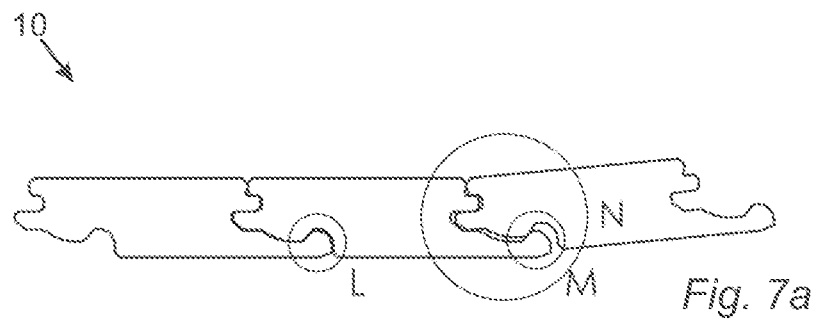
FIG. 7a illustrates an exemplary assembling process of a set of panels of FIG. 2b according to an embodiment.
Figure 7B:
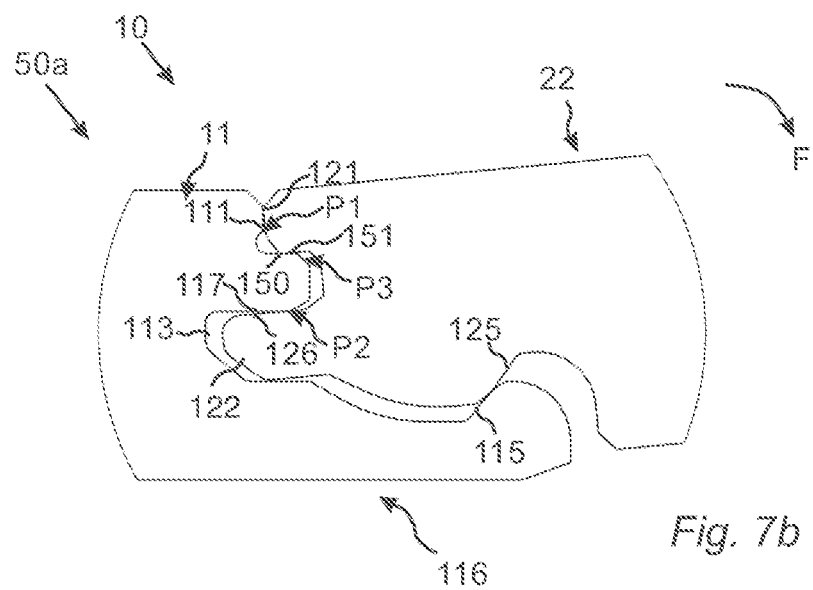
Figure 7C:
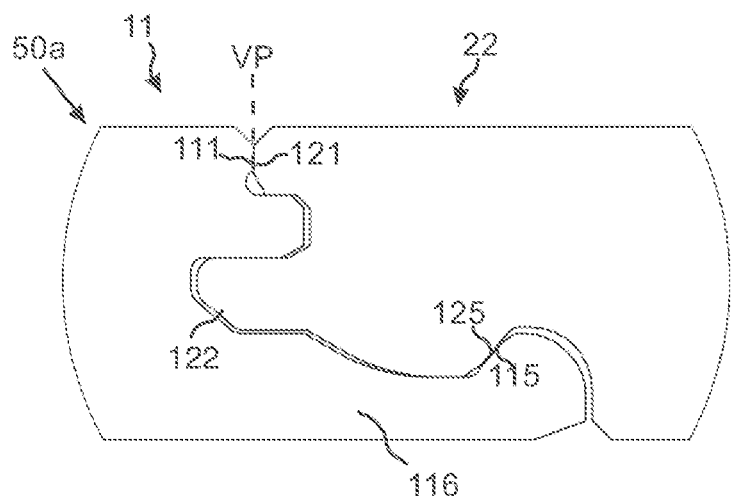
FIG. 7c illustrates of details of the embodiment of FIG. 7a in locking position.

Referring to FIGS. 7*a*-7*c*, the first edge 11 may comprise a lower lip surface 150 provided between the upper edge portion 111 and the tongue groove 113. The lower lip surface 150 may extend essentially parallel the upper wall surface portion 117 and/or essentially perpendicular the upper edge portion 111.

Further to FIGS. 7*a*-7*c*, the second edge 12, 22 of the panel 10 and 20 respectively, may in any embodiment comprise an upper lip surface 151 configured to abut the lower lip surface 150 when two panels are assembled in locking position, as shown in FIG. 7*c*. The lower lip portion 151 may be provided between the upper edge portion 121 and the locking tongue 122. The upper lip portion 151 may extend essentially parallel the upper surface portion 126 of the locking tongue 122 and/or essentially perpendicular the upper edge portion 121. It should be appreciated that any of the opposite edge portions 11-14 may comprise such cooperating upper- and lower lip portions, not limited to edge portions comprising the first locking system 50*a* but also including edge portions comprising the second locking system 50*b*.

A third contact point P3 may be defined as between the upper lip portion 151 and the lower lip portion 150.

According to a preferred embodiment, a locking angle LA may be adapted to allow the folding displacement without overlapping of the first locking surface 115 and the second locking surface 125, for example while P1 is simultaneously in contact, more preferably while P1 and P2 are simultaneously in contact. Optionally P3 is simultaneously in contact. The term "overlapping" may in this context refer to engagement between the first locking surface 115 and the second locking surface 125.

FIGS. 3 and 6*b* illustrates an exemplary embodiment of the second locking system 50*b* which may be provided at respective opposite third 13 and fourth 14 edges, such as short edges, for assembling a first panel in an assembled position with an adjacent second panel by means of a folding displacement F or a vertical displacement of the adjacent panel, such as a linearly vertical displacement.

As shown in the embodiment of FIG. 6*b*, the second contact point P2 may be defined as between the surface portion of the lower wall portion 137 of the tongue groove 138 of the second panel 20 and a lower surface portion 149 of the locking tongue 148 of the first panel 10.

The locking system 50*a* may be configured such that the first and second locking surfaces 115, 125 do not overlap during assembling of the first and second panel and, preferably such that there is provided play Dt (see FIG. 5*b*) between the first and second locking surfaces 115, 125 of the first pair of horizontal locking surfaces in assembled position of the first and second panels 10, 20.

Referring again to FIGS. 5*b* and 6*d*, the locking angle LA may be formed between the second locking element and the rear surface 16 of the panel. The locking angle LA may be measured in a clockwise angular direction in FIG. 6*d*. The locking angle LA may preferably be in the range of 40 to 50 degrees, preferably 45 to 55 degrees, more preferably 48 to 52 degrees, such as 50 degrees.

Figure 6D:
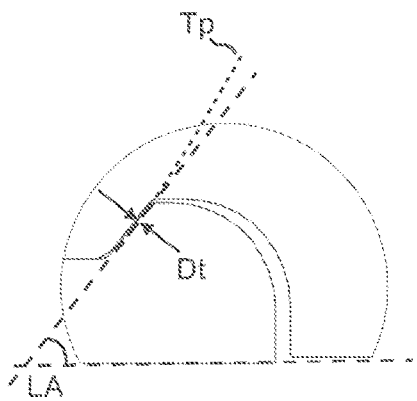

The second locking surface 125 may be configured to extend essentially parallel the first locking surface 115 in assembled position of the panels, as derivable from FIG. 6*d*.

The locking system 50*a* and preferably 50*b* may be configured such that in assembled position of the first and second panels 10, 20, there is provided a play Dt (see FIGS. 5*b* and 6*d*) between the first pair of horizontal locking surfaces, preferably 0 to 0.1 mm play.

The play Dt may be provided along a substantial portion of the locking surfaces 115, 125 and/or 132, 145.

The locking angle LA may be adapted to allow the folding displacement without abutment of the first locking surface 115 and the second locking surface 125.

Generally, in any embodiment, the locking angle LA may be configured to allow assembling by means of the folding displacement without flexing or compression of any part of the locking system 50*a*, 50*b*, excepting the displaceable tongue 148, which may be displaced into the displacement groove 142 by, for example, flexing of flexible protrusions on the tongue 148. The displaceable tongue 148 may be configured to flex and/or displace into the displacement groove 142 to an extent which suffice for allowing the panels to be assembled exclusively by means of a substantially vertical displacement VF.

Accordingly, the locking angle LA may be adapted to allow assembling by means of the folding displacement without flexing or compression of the locking strip 116.

Accordingly, the locking angle LA may be adapted to allow assembling by means of the folding displacement without flexing or compression of the second edge 22 of the second panel.

The locking angle LA may be adapted to allow assembling by means of the folding displacement without flexing or compression of the locking element 114.

The locking strip 116 may be formed in the core 3, preferably the entire locking strip 116 is formed in the core 3, thus the core material, such as MgO, may extend continuously from the tongue groove 113 or displacement groove 112 to and including the locking element 114. The locking element 114 may thus preferably be formed in the core 3.

The locking element 114 may be formed as an integral part of the locking strip 116.

The plane of the first horizontal locking surface 115 of the first panel 10 may define a datum plane Dm.

Figure 5A:
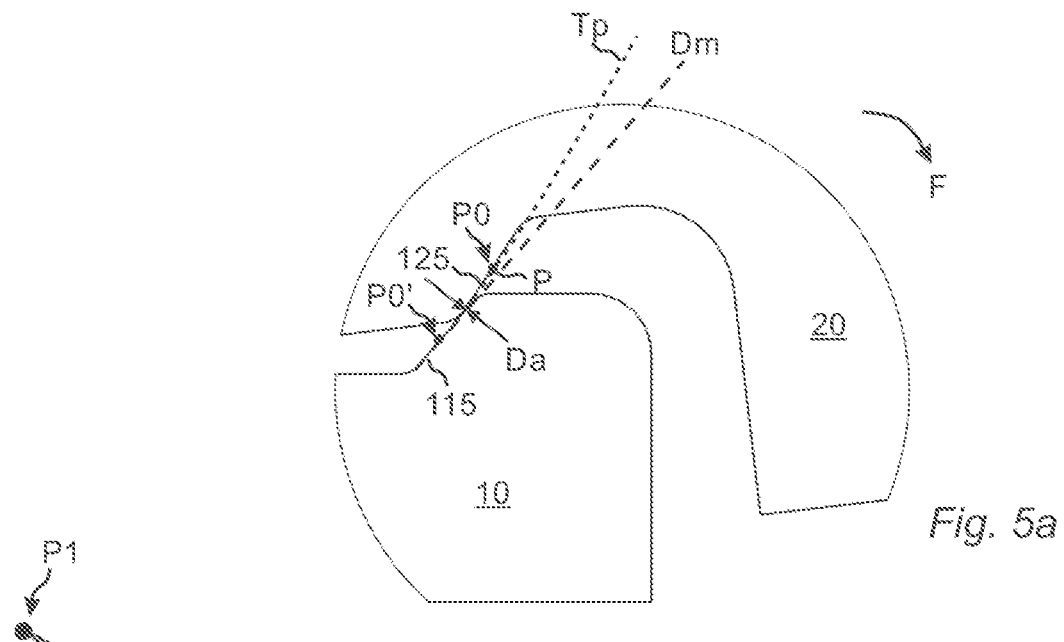
Figure 5B:
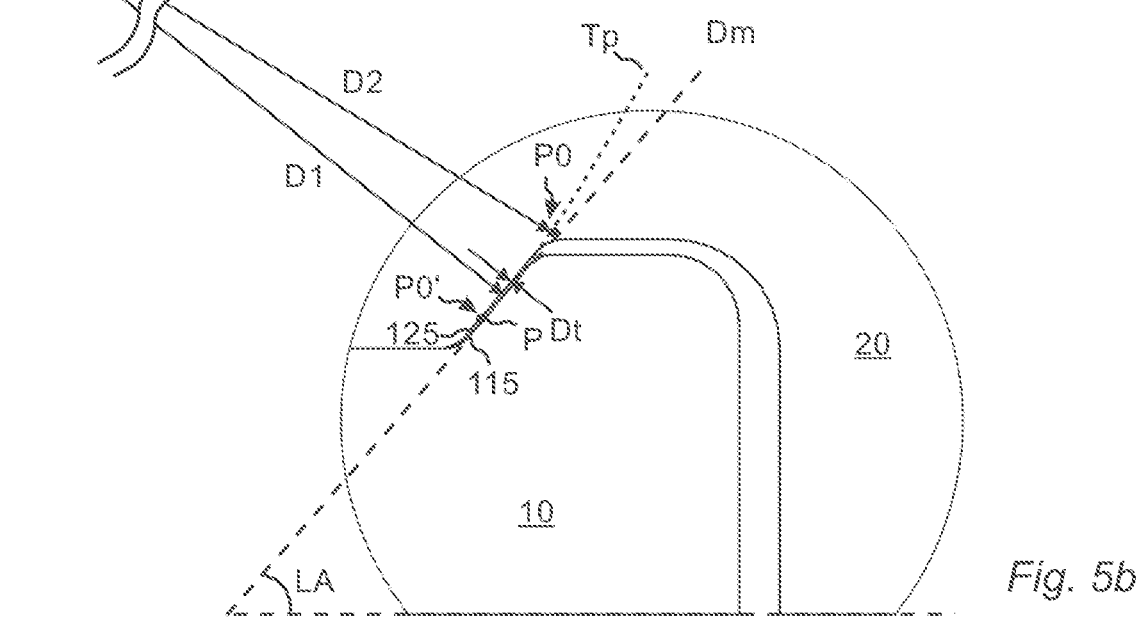

As shown in FIGS. 5*a*-5*b*, according to any embodiment, there may be provided a minimum play Da between the first locking surface 115 and the second locking surface 125 during assembling (see FIG. 5*a*) of the first and second panel to the locking position (see FIG. 5*b*). The play Da between the first pair of horizontal locking surfaces may be in the range of more than 0 to 0.1 mm.

In one embodiment there may be zero or least no negative play between the first pair of horizontal locking surfaces 115, 125 during assembling, such as during displacement from the first position to the second assembled positon.

As shown for example in FIGS. 5*a*-5*b*, according to any embodiment, the play Da between the first locking surface 115, 145 and the second locking surface 125, 134 during assembling (see FIG. 5*a*) may be a minimum play between the first locking surface 115 and the second locking surface 125 during assembling of the first and second panel to the locking position (see FIG. 5*b*). The play Da may be in the range of 0 to 0.1 mm.

Preferably, there is provided play between the first locking surface 115 and the second locking surface 125 during assembling of the first and second panel to the locking position.

Referring to FIG. 5a, a point P on the said portion of the second horizontal locking surface 125 may be positioned at a first space position P0, such as when P1 and optionally P2 are in contact, as shown in FIG. 4b. By means of the folding displacement F, such as of the second panel 20, preferably about the second edge 22 of the second panel 20, the point P may displace according to a projected trajectory Tp to a second space position P0', as illustrated in FIG. 5a-5b.

Thus, when point P is positioned in the first position P0, a projected trajectory Tp of point P from the first position P0 to the second position P0' may form an arc of a circle, preferably having as P1 as pivotal point and with radius of curvature R1.

The projected trajectory Tp may be one or more of a projected trajectory and a predetermined trajectory.

The locking angle LA and optionally Dt may be configured such that the said projected trajectory does not cross the plane Dm during assembling of the first and second panel 10, 20 to the locking position by means of the folding displacement F, preferably while there is contact at contact point P1 and/or P2. In particular, the locking angle LA and optionally Dt is configured such that the projected trajectory Tp does not cross from one side of the plane Dm, such as an upper side, to the other side of the plane Dm, such as a lower side during said assembling by means of the folding displacement F. It should be appreciated that the above may be valid without flexing of any of the parts of the locking system 50a, 50b. Thus, point P may preferably displace along the projected trajectory from P0 to P0' without influence of the locking element 114 and in particular without influence of the first locking surface 115.

Thereby, a projected trajectory Tp of point P of the locking surface 125 from position P0 to position P0' in response to a folding displacement F of the second panel 20, such as about the second edge 22 of the second panel 20, may be disposed on one side, preferably entirely on one side, of the first locking surface 115 and/or a datum plane Dm of the first locking surface 115 during the folding displacement F while at least one of points P1, P2 and P3 are in contact. The datum plane Dm may be stationary.

Assembling of the first and second panel 10, 20 may herein comprise a displacement in an assembling direction from a first position wherein the adjacent edges 11, 12; 13; 14 are in contact in point P1, to a second assembled position for horizontal locking of the adjacent edges by means of the first locking surface 115 and the second locking surface 125. For example the first position may be where point P of the second locking surface 125 is in space position P0 and the second assembled position may be where point P is arranged in space position P0' as shown in FIG. 5b.

Accordingly, in any embodiment, the distance between the pivot point, such as the first contact point P1 and a point on the first locking surface 115 may be constant during assembling by means of the folding displacement F.

A shortest distance D1 between a pivot point, such as contact point P1, of the panel being folded, and the first locking surface 115 may be greater than a greatest distance D2 between the said pivot point and the second locking surface 125 as shown in FIG. 5b. Thus, considering point P on the second locking surface 125, which may be any given point of the second locking surface 125. D2 may correspond to radius of curvature R1.

Referring again to FIGS. 9a-9b and 11a-11c, there is illustrated exemplary embodiments of the second aspect.

The panel 10, such as a floor panel, comprises a core 3 and may comprise an upper arrangement 5 and a lower arrangement 6. The panel comprises one or more mineral-based layers, as explained in relation to the first aspect. Thus, one or more of the core 3, the upper arrangement 5 and the lower arrangement 6 may comprise a mineral-based layer 3, 5, 6, preferably comprising magnesium oxide. According to the second aspect, one or more of said mineral-based layers comprises reinforcement fibres 50 embedded in a mineral-based matrix 51, the matrix 51 preferably comprising magnesium oxide. The fibres 50 may be configured to increase the tensile strength of the mineral-based layer 3, 5, 6.

A mineral-based layer, such as an MgO layer, may have many different compositions depending on the required properties. The layer is typically produced by creating a slurry in water and then pouring the slurry into moulds. The slurry will then dry and become rigid, thereby forming a board that will make a mineral-based layer in a building panel. A typical drawback of mineral-based boards may include that they absorb water, are very brittle and hard to profile using e.g. rotating tools to form a mechanical locking system along the edges. However, advantages include that mineral-based layers are dimensionally stable and have fire-retardant properties.

Figure 9A:
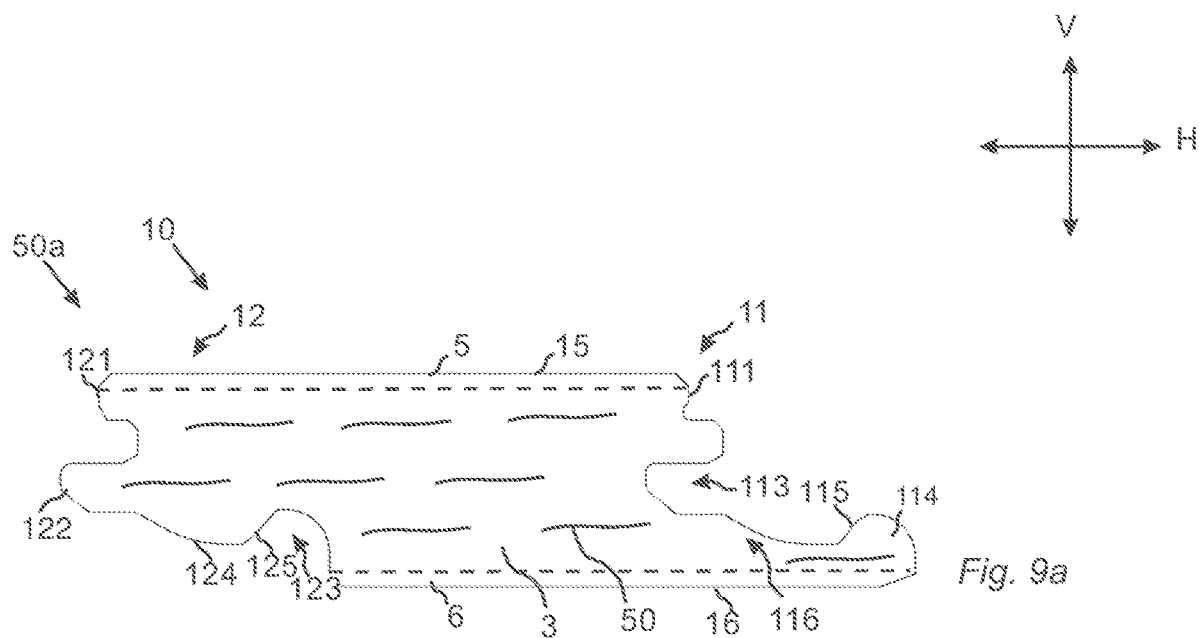
FIGS. 9a-9b illustrates exemplary embodiments of the second aspect.
Figure 9B:
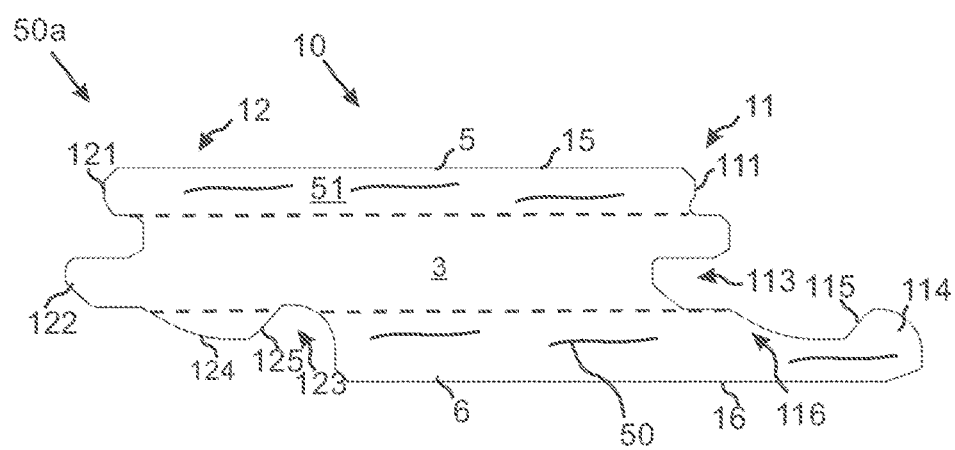

According to the second aspect, reinforcement fibres 50, such as long fibres, are provided in the inorganic matrix 51 ($MgO/MgSO_4$) as shown for instance in FIGS. 9a-9b. The fibres may preferably be arranged in the matrix prior to a step of drying of the mineral-based layer.

The fibers 50 are preferably longer than the traditional wood fibers that are used in known systems and can be of inorganic or inorganic material. Thereby, in contrast to a mineral-based layer with short wood fibers, the board according to the invention with long fibers may withstand more bending forces and are less brittle, thus these properties render them more suitable and easier to form a mechanical locking system therein, such as a mechanical locking system 50a, 50b according to the first aspect.

An aspect ratio (length-to-diameter) of the fibres 50 may be in the range of between 30 to 150. Preferably, for concrete, the aspect ratio should preferably be above 75. A thin and short fibre may only have a limited effect when for example hardening the cement/matrix but will not increase the tensile strength. Fibers with low E-module, such as nylon and PP may facilitate increased toughness of the layer. Fibres with high modulus, such as glass, carbon and steel fibre may facilitate increased strength of the layer.

As briefly discussed, the fibres 50 may comprise organic fibres, such as synthetic fibers, such as polypropylene fibre, such as fibres sold under the trade name Masterfiber 246, plolyvinylalchohol fibre, for example sold under the trade name Masterfiber 400, Polyester fibre, nylon fibre or combinations thereof.

An aspect ratio of the synthetic fibres, such as length divided by diameter, preferably an average aspect ratio, may be in the range of 25 to 700, more preferably 75 to 300.

The fibres 50 may comprise organic fibres, such as natural fibers, such as flax, hemp, bamboo, cotton, wood, sisal, jute, ramie, or combinations thereof.

The aspect ratio of the natural fibres, such as length divided by diameter, preferably an average aspect ratio of the fibres, may be in the range of 25 to 700, more preferably 100 to 400.

The fibres 50 may comprise inorganic fibers such as glass fibres, carbon fibres, steel fibres or combinations thereof.

The fibres 50 may comprise a mix of any of the organic and any of the inorganic fibers described herein.

The aspect ratio of the inorganic fibres, such as length divided by diameter, preferably an average aspect ratio of the fibres, may be in the range of 50 to 2000, more preferably 75 to 1000.

In any embodiment, the length of the fibres, such as an average length, is in the range of 3 to 50 mm, more preferably 3 to 25 mm.

In any embodiment, the volume % of fibres in the mineral based layer comprising fibres may be in the range of 0.1% to 7%, more preferably 1% to 4%.

In any embodiment, the fibres may be provided in form of non-woven fibres. For example the fibers may be randomly oriented and/or randomly distributed individual fibers. For example the fibers may be non-woven non-unidirectional fibres.

The fibres may be distributed between an upper surface of the mineral-based layer and a lower surface of the mineral-based layer, such as between an upper surface of the core 3a and a lower surface of the core 3b. The fibres may preferably be substantially evenly or uniformly distributed in the thickness direction of the mineral-based layer between the upper surface of the mineral-based layer and the lower surface of the mineral-based layer.

The fibres may be configured to extend in the matrix or layer with a longitudinal axis of the fibres oriented essentially parallel the plane of the panel, such as a horizontal plane H or a lower surface 16 of the core as derivable e.g. from FIG. 2a.

FIGS. 10a-10b and 11a-11c illustrate exemplary embodiments of a third aspect. According to embodiments of the third aspect, the mineral-based layer comprises additives which makes the brittle and rigid matrix, such as MgO inorganic matrix (MgO/MgSO$_4$), more flexible. An effect of providing a polymer compound may be facilitation of a more flexible and/or water-resistant mineral-based layer. A more flexible mineral-based layer may facilitate ease of profiling a mechanical locking system, such as by means of rotating tool(-s), and may optionally or additionally provide a more flexible mechanical locking system, thereby reducing the risk of damaging the panel and/or the locking system, such as during assembling. The polymer may preferably be added during the production of MgO boards when mixing the components making up the board.

The polymer component may be provided as a dispersion (polymer "droplets" dispersed in water) or a dispersible powder. Thereby, the polymers will be situated between and around the inorganic material, such as MgO, and thus facilitate softening of the inorganic material and thus a flexible mineral-based layer compared to for example MgO without the addition of polymers. The polymer component should preferably have a low glass transition temperature Tg(° C.) for example below 30° C. preferably below 0° C., more preferably −10 to 20° C.

The polymer component may be based on the following chemistries: Acrylic, Styrene-Acrylic, Vinyl-acetate, Vinyl-Acetate-vinylchloride Styrene-Butadiene, vinylidene chloride.

The polymer compound may be added in an amount of 1 to 15 wt %, more preferably 5 to 10 wt % of the mineral-based layer.

The polymer compound may contribute to improved adhesion between the mineral-based layer and adjacent layers when used in mortars. The polymer compound may also improve the adhesion of glue when adhering of the mineral-based layer to an adjacent layer, such as adhering an upper and/or lower arrangement to a mineral-based core.

It should be emphasized that FIGS. 9a-9b, 10a-10b and 11a-11c show non-limiting exemplary embodiments and that combination of embodiments of the first aspect, the second aspect and the third aspect may yield further embodiments. For example, the embodiments shown in FIGS. FIGS. 9a-9b, 10a-10b and 11a-11c features the locking system 50a for purpose of conveying the invention and should not be construed as limiting the invention to the illustrated embodiments shown therein. In a further example, fibres 50 may be embedded in the core 3 and a polymer compound may or may not be provided in the matrix 51 of a mineral-based layer of the upper- and/or lower arrangement. In a still further example, fibres 50 may be embedded in a mineral-based layer of the upper- and/or lower arrangement and a polymer compound 60 may or may not be provided in the matrix 51 of a mineral-based the core 3.

Referring again to FIG. 9a, an exemplary embodiment of a panel 10 is shown wherein the mineral-based core 3 comprises fibers 50 according to any embodiment of the disclosure embedded in the matrix 51. At least parts of the mechanical locking system 50a are formed in the core 3, including the locking strip 116 and the locking element 114 at the first edge 11, the locking tongue 122 and the locking groove 123 at the second edge 12. It should be appreciated that at least parts of the second locking system 5b may be formed in the core 3, such as at least a portion of the second locking strip 146. The fibers 50 preferably configured to increase the tensile strength of the mineral-based layer 3 compared to a mineral-based layer without the fibers and/or render parts of the locking system 50a formed in the mineral-based layer(s) more flexible and/or less brittle compared to a mineral-based layer without the fibers.

In the exemplary embodiment of FIG. 9b the panel 10 also comprises a core 3 according to any embodiment of the core 3 disclosed herein, such as a wood-based core. The lower arrangement 6 and optionally the upper arrangement 5 comprises a mineral-based layer according to any embodiment of the disclosure and fibers 50 according to any embodiment of the disclosure embedded in the matrix 51 during manufacture of the mineral-based layer. At least parts of the mechanical locking system 50a are formed in a mineral-based layer, such as a mineral-based layer of the lower arrangement 6, including at least a portion of the locking strip 116 and the locking element 114 at the first edge 11. It should be appreciated that at least parts of the second locking system 5b may be formed in the core 3, such as at least a portion of the second locking strip 146. The fibers 50 preferably configured to increase the tensile strength of the mineral-based layers 5, 6 compared to a mineral-based layer without the fibers and/or render parts of the locking system 50a formed in the mineral-based layer(s) more flexible and/or less brittle compared to a mineral-based layer without the fibers.

FIG. 10a shows an exemplary embodiment of a panel 10 wherein a mineral-based core 3 according to any embodiment comprises a polymer compound 60 according to any embodiment of the disclosure. At least parts of the mechanical locking system are formed in the core 3, such as at least a portion of the locking strip 116 and the locking element 114 at the first edge 11, at least a portion of the locking tongue 122 and at least a portion of the locking groove 123 at the second edge 12. The polymer compound may preferably be configured to render the panel 10 and/or said parts of the locking system 50a formed in the core 3, such as the locking strip 116 and/or locking tongue 122, softer and/or more flexible compared to a mineral-based layer without the polymer compound.

Referring again to FIG. 10b, an exemplary embodiment of a panel 10 is shown comprising a core 3 according to any embodiment of the core 3 disclosed herein, such as a wood-based core. The lower arrangement 6 and optionally the upper arrangement 5 comprises a mineral-based layer. The mineral-based layer comprises a polymer compound according to any embodiment of the disclosure, such as embedded in the matrix 51 during manufacture of the mineral-based layer. At least parts of the mechanical locking system are formed in a mineral-based layer, such as a mineral-based layer of the lower arrangement 6, such as at least part of the locking strip 116 and the locking element 114 at the first edge 11 and at least part of the locking groove 123 at the second edge 12. The polymer compound 60 may preferably be configured to render the panel 10 and/or said parts of the locking system 50a formed in the mineral-based layer, such as the locking strip 116 and/or locking tongue 122, softer and/or more flexible compared to a mineral-based layer without the polymer compound, and/or less brittle.

Figure 11A:
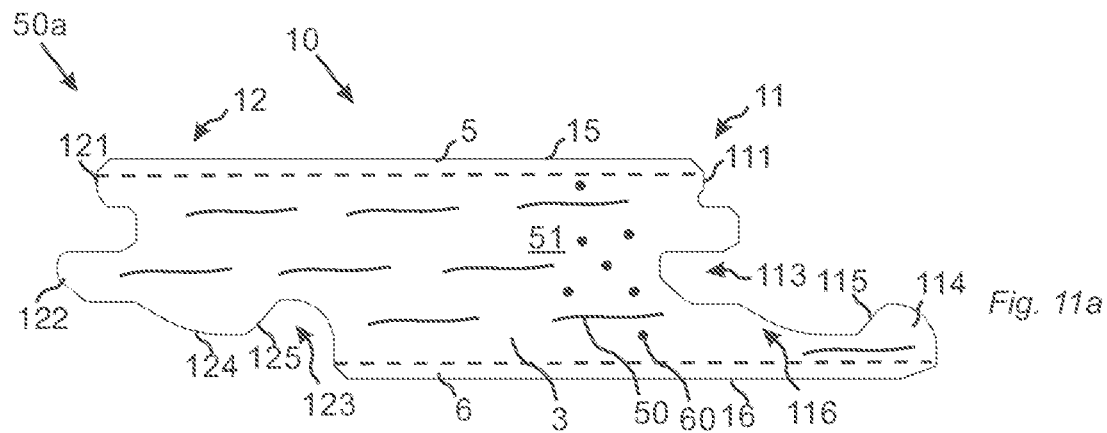
FIG. 11a illustrates an embodiment according to the inventive concept.

FIG. 11a shows an exemplary embodiment of a panel 10 wherein the mineral-based core 3 comprises a polymer compound 60 according to any embodiment of the disclosure, such as embedded in the matrix 51, for example the polymer compound 60 is configured to render the panel 10 more flexible.

The mineral-based core 3 additionally comprises fibers 50 according to any embodiment of the disclosure embedded in the matrix 51.

At least parts of the mechanical locking system are formed in the core 3, including the locking strip 116 and the locking element 114 at the first edge 11, the locking tongue 122 and the locking groove 123 at the second edge 12. The polymer compound 50 may preferably be configured to render one or more of the panel 10 and parts of the locking system 50a formed in the mineral-based layer(s), for example the locking strip 116, softer and/or more flexible, compared to a mineral-based layer without the polymer compound. The fibers 50 preferably configured to increase the tensile strength of the mineral-based layer 3 compared to a mineral-based layer without the fibers and/or render parts of the locking system 50a formed in the mineral-based layer(s) more flexible and/or less brittle compared to a mineral-based layer without the fibers, such as the locking strip 116 and/or locking tongue 122.

Figure 11B:
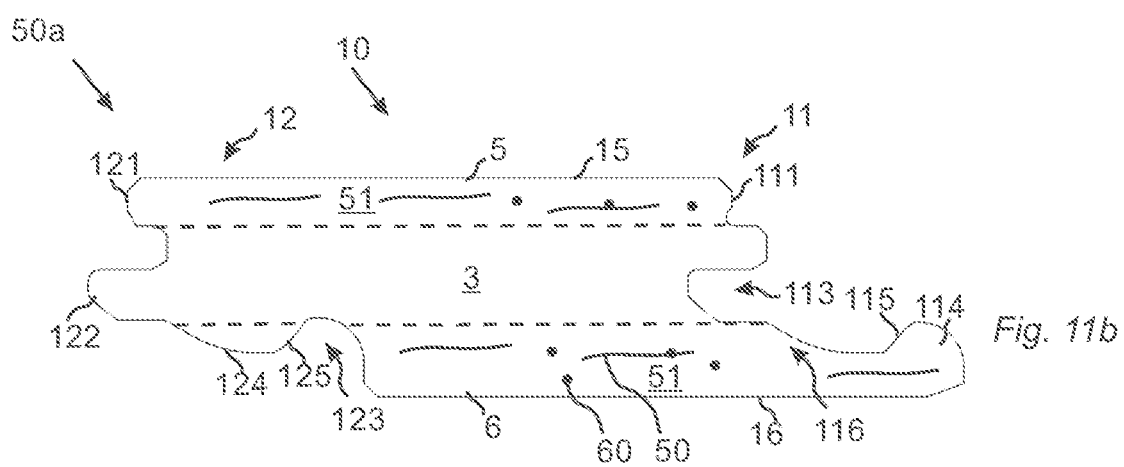
FIG. 11b illustrates a further embodiment of the inventive concept.

In the exemplary embodiment of FIG. 11b the panel 10 also comprises a core 3 according to any embodiment of the core 3 disclosed herein, such as a wood-based core. The lower arrangement 6 and optionally the upper arrangement 5 comprises a mineral-based layer according to any embodiment of the disclosure and fibers 50 according to any embodiment of the disclosure embedded in the matrix 51. In addition, the matrix 51 of the mineral-based layer of the upper arrangement 5 and/or the matrix 51 of the mineral-based layer of the lower arrangement 6 comprises a polymer compound 60 according to any embodiment of the disclosure. The polymer compound 50 may preferably be configured to render one or more of the panel 10 and parts of the locking system 50a formed in the mineral-based layer(s) softer and/or more flexible, compared to a mineral-based layer without the polymer compound, for example the locking strip 116. The fibers 50 preferably configured to increase the tensile strength of the mineral-based layers 5, 6 compared to a mineral-based layer without the fibers and/or render parts of the locking system 50a formed in the mineral-based layer(s) more flexible and/or less brittle compared to a mineral-based layer without the fibers.

Figure 11C:
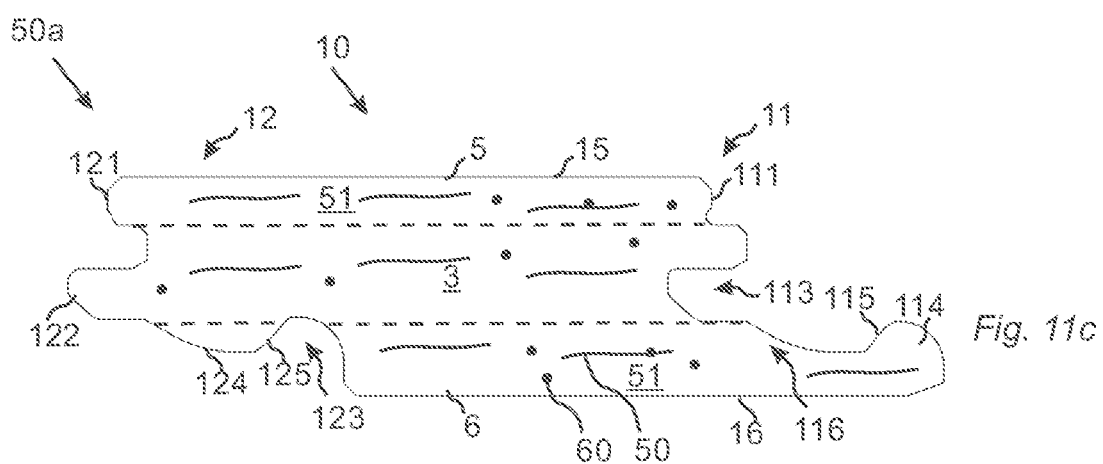
FIG. 11c illustrates a still further embodiment according to the inventive concept.

In the exemplary embodiment of FIG. 11c there is shown a panel 10 having a mineral-based core 3 comprising a polymer compound 60 and fibers 50 according to any embodiment of the disclosure. The upper arrangement 5 and the lower arrangement 6 comprises a mineral-based layer comprising in the matrix 51 a polymer compound 60 and fibers 50 according to any embodiment of the disclosure the matrix 51. The polymer compound 50 may preferably be configured to render one or more of the panel 10 and parts of the locking system 50a formed in the mineral-based layer(s) softer and/or more flexible compared to a mineral-based layer without the polymer compound, for example the locking strip 116. The fibers 50 preferably configured to increase the tensile strength of the mineral-based layers 3, 5, 6 compared to a mineral-based layer without the fibers and/or render parts of the locking system 50a formed in the mineral-based layer(s) more flexible and/or less brittle compared to a mineral-based layer without the fibers.

Accordingly, a panel in which one or more mineral-based layers 3, 5, 6 comprises fibers 50 and/or the polymer compound 60 may be particularly advantageous in combination with embodiments of the locking system 50a configured to reduce or circumcise flexing of at least the said parts formed in the one or more mineral-based layers, wherein at least parts of the mechanical locking system 50a is formed in a mineral-based layer 3, 5, 6.

Items

ITEM 1. A panel 10, such as a floor panel, comprising a core 3, an optional upper arrangement 5 and an optional lower arrangement 6, wherein one or more of the core 3, the upper arrangement 5 and the lower arrangement 6 comprises a mineral-based layer, preferably comprising magnesium oxide.

ITEM 2. The panel according to item 1, wherein one or more of said mineral-based layers comprises reinforcement fibres 50 embedded in a mineral-based matrix 51, preferably comprising magnesium oxide, wherein the fibres are configured to increase the tensile strength of the mineral-based layer.

ITEM 3. The panel according to item 2, wherein the fibres comprise organic fibres, such as synthetic fibers, such as Polypropylene fibre, Plolyvinylalchohol fibre, Polyester fibre, Nylon fibre or combinations thereof.

ITEM 4. The panel according to any one of the preceding items 2 to 3, wherein the aspect ratio, such as an average aspect ratio, such as length divided by diameter, of the fibres is in the range of 25 to 700, more preferably 75 to 300.

ITEM 5. The panel according to item 2, wherein the fibres comprise organic fibres, such as natural fibers, such as flax, hemp, bamboo, cotton, wood, sisal, jute, ramie, or combinations thereof.

ITEM 6. The panel according to item 5, wherein the aspect ratio, such as an average aspect ratio, such as length divided by diameter, of the fibres is in the range of 25 to 700, more preferably 100 to 400.

ITEM 7. The panel according to item 2, wherein the fibres comprise inorganic fibers such as glass fibres, carbon fibres, steel fibres or combinations thereof.

ITEM 8. The panel according to item 7, wherein the aspect ratio, such as an average aspect ratio, such as length divided by diameter, of the fibres is in the range of 50 to 2000, more preferably 75 to 1000.

ITEM 9. The panel according to any one of the preceding items 2 to 8, wherein the length of the fibres, such as an average length, is in the range of 3 to 50 mm, more preferably 3 to 25 mm.

ITEM 10. The panel according to any one of the preceding items 2 to 9, wherein the volume % of fibres in the mineral based layer comprising fibres is in the range of 0.1% to 7%, more preferably 1% to 4%.

ITEM 11. The panel according to any one of the preceding items 2 to 10, wherein the fibres are provided in shape of non-woven fibres.

ITEM 12. The panel according to any one of the preceding items 2 to 11, wherein the fibres are arranged in the matrix prior to a step of drying of the mineral-based layer.

ITEM 13. The panel according to any one of the preceding items 2 to 12, wherein the fibres are distributed between an upper surface of the mineral-based layer and a lower surface of the mineral-based layer, such as between an upper surface 3a of the core and a lower surface 3b of the core.

ITEM 14. The panel according to any one of the preceding items 2 to 13, wherein the fibres are oriented to extend essentially parallel the plane of the panel, such as a horizontal plane H or a lower surface 16 of the core.

ITEM 15. The panel according to any of the preceding items 1 to 14, wherein the mineral-based layer 3, 5, 6 further comprises a polymer compound.

ITEM 16. The panel according to item 15, wherein the polymer compound comprises Acrylic, Styrene-Acrylic, Vinyl-acetate, Vinyl-Acetate-vinylchloride, Styrene-Butadiene, vinylidene chloride or combinations thereof.

ITEM 17. The panel according to any of the preceding items 15 to 16, wherein the mineral-based layer comprises the polymer compound in an amount of 1 to 15 wt %, more preferably 5 to 10 wt %.

ITEM 18. The panel according to any of the preceding items 15 to 17, wherein the polymer compound has a glass transition temperature, and the glass transition temperature of the polymer compound is in the range of −50 to 30° C., more preferably −10 to 20° C.

ITEM 19. The panel according to any one of the preceding items 1 to 18, wherein the mineral-based layer further comprises magnesium chloride and/or magnesium sulphate.

ITEM 20. The panel according to any one of the preceding items 1 to 19, wherein the mineral-based layer further comprises at least one filler, such as Perlite, Sand, Talc, Fly ash, Calcium Carbonate or combinations thereof in an amount of 0 to 50 wt %, such as 10 to 40 wt %.

ITEM 21. The panel according to any one of the preceding items 1 to 20, wherein the mineral-based layer further comprises a binding agent, such as wood shavings or wood fibres, in an amount of 0 to 30 wt %, such as 5 to 25 wt %.

ITEM 22. The panel according to any one of the preceding items 1 to 21, wherein the mineral-based layer further comprises at least one additive, such as defoaming agent, dispersing agent, anti-corrosion agent, water resistance additive of combinations thereof, in an amount of 0 to 20 wt %, such as 2-15 wt %.

ITEM 23. The panel according to any one of the preceding items 1 to 22, wherein the panel comprises a mechanical locking system 50a, 50b at respective opposite first 11 and second 12 edges, such as long edges, for assembling a first panel 10 in an assembled position with an adjacent second panel 20 by means of a folding displacement F and/or a vertical displacement of the adjacent panels 10, 20; wherein immediately juxtaposed upper edge portions 111, 121 of the first edge 11 of the first panel 10 and the second edge 22 of the second panel 20 in the assembled position form a vertical plane VP; the first edge 11 comprising a locking strip 116 projecting beyond the vertical plane VP and a locking element 114 projecting from the locking strip 116; the second edge 12 comprising a downwards open locking groove 123 configured to receive the locking element by means of said displacement F for horizontal locking of the adjacent panels, wherein a first pair of horizontal locking surfaces comprises a first locking surface 115 provided by the locking element 114 and a second locking surface 125 provided by the locking groove 123.

ITEM 24. The mineral-based panel according to item 23, wherein the locking system 50a, 50b is configured such that there is provided play Da, such as a minimum play, between the first locking surface 115 or at least a portion of the first locking surface 115 and the second locking surface 125 or at least a portion of the second locking surface 125 during assembling of the first and second panel 10, 20 by means of said displacement F.

ITEM 25. The mineral-based panel according to item 23 or 24, wherein the locking system 50a, 50b is configured such that there is provided play Dt, such as a minimum play, between the first locking surface 115, such as at least a portion of the first locking surface 115 and the second locking surfaces 125, such as at least a portion of the second locking surfaces 125, in locking position.

ITEM 26. The mineral-based panel according to any one of the preceding items 23 to 25, wherein one of the first or second edge 11, 12 comprises a locking tongue 122, 118 and the other of the first or second edge comprises a tongue groove 113, 128; wherein the locking system 50a, 50b is configured such that the locking tongue is received in the tongue groove of the second edge by means of a folding displacement F and/or a vertical displacement, such as a linear vertical translation, of the adjacent second panel 20, for vertical locking of first edge and the second edge.

ITEM 27. The mineral-based panel according to any one of the preceding items 23 to 26, wherein during said assembling, said upper edge portions 111, 121 are simultaneously in contact in a first contact point P1 and/or an upper wall portion 127 of the tongue groove 123 and an upper portion 126 of the locking tongue 122 are simultaneously in contact in a second contact point P2.

ITEM 28. The mineral-based panel according to any one of the preceding items 23 to 27, wherein a locking angle LA is formed between the first locking surface 115 and a rear surface 16 of the panel 10, said locking angle LA preferably measured in a clockwise direction from the plane of the first locking surface 115, the locking angle LA being in the range of 40 to 60 degrees, preferably 45 to 55 degrees, more preferably 48 to 52 degrees, such as 50 degrees.

ITEM 29. The mineral-based panel according to any one of the preceding items 23 to 28, wherein the second locking surface 125 is configured to extend essentially parallel the first locking surface 115 in assembled position of the panels.

ITEM 30. The mineral-based panel according to any one of the preceding items 23 to 29, wherein assembled position of the first and second panels, there is provided a play Dt, such as a minimum play, between the first locking surface and the second locking surface, preferably the play Dt in in the range of 0 to 0.1 mm, for example measured along a horizontal plane H.

ITEM 31. The mineral-based panel according to any one of the preceding items 23 to 30, wherein Da is in the range of 0-0.1 mm, for example measured transverse the first locking surface 115.

ITEM 32. The mineral-based panel according to any one of the preceding items 23 to 31, wherein said play Dt is provided along a substantial portion of the locking surfaces 115, 125.

ITEM 33. The mineral-based panel according to any one of the preceding items 23 to 32, wherein the locking angle LA is adapted to allow said folding displacement F without abutment of the first locking surface 115 and the second locking surface 125.

ITEM 34. The mineral-based panel according to any one of the preceding items 23 to 33, wherein the locking angle LA is adapted to allow assembling by means of said folding displacement F without flexing or compression of the locking strip 116.

ITEM 35. The mineral-based panel according to any one of the preceding items 23 to 34, wherein the locking angle LA is adapted to allow assembling by means of said folding displacement without flexing or compression of the locking element 114.

ITEM 36. The mineral-based panel according to any one of the preceding items 23 to 35, wherein the locking angle LA is configured such that it is sufficiently low to allow assembling by means of a folding displacement F without overlapping of the second pair of horizontal locking surfaces 125, 115 while the first pair of horizontal locking surfaces 111, 121 are simultaneously in contact.

ITEM 37. The mineral-based panel according to any one of the preceding items 23 to 36, further comprising a lower arrangement 6 comprising one or more layers, and an upper arrangement 5 comprising one or more layers.

ITEM 38. The mineral-based panel according to any one of the preceding items 23 to 37, wherein the locking strip 116 is formed in one of a mineral-based layer of the panel or in the core 3 of the panel.

ITEM 39. The mineral-based panel according to any one of the preceding items 23 to 38, wherein the locking element 114 is formed in a mineral based layer of the panel or in the core 3 of the panel.

ITEM 40. The mineral-based panel according to any one of the preceding items 23 to 39, wherein the locking element 114 is formed as an integral part of the locking strip 116.

ITEM 41. The mineral-based panel according to any one of the preceding items 23 to 40, wherein a point P on the second locking surface 125 is displaced along a projected or predetermined trajectory Tp from a first space position P0 to a second space position P0' in response to a folding displacement F of the second panel 20 to said assembled position, such as folding of the second panel 20 about the second edge 12, wherein said predetermined trajectory Tp is disposed on one side, preferably entirely on one side, of a datum plane Dm of the first locking surface 115 during the folding displacement F.

ITEM 42. The mineral-based panel according to the preceding item 41, wherein at least one of a first contact point P1 and a second contact point P2 and a third contact point P3 are in contact.

ITEM 43. The mineral-based panel according to the preceding item 42, wherein said predetermined trajectory Tp forms an arc or a circle having contact point P1 as pivot point.

ITEM 44. The mineral-based panel according to any one of the preceding items 42 or 43, wherein the first contact point P1 is between at least a portion of respective upper edge portions 111, 121 of the first and second panel 10, 20, and wherein the second contact point P2 is between a first pair of vertical locking surfaces.

ITEM 45. The mineral-based panel according to any one of the preceding items 1 to 44, wherein one or more of the core and the mineral-based layer comprises non-hydraulic cement, preferably magnesium oxide, and optionally magnesium chloride, such as $MgCl_2$ and/or magnesium sulphate, such as $MgSO_4$.

ITEM 46. A set of mineral-based panels according to any one of the preceding items 1 to 45.

ITEM 47. A method of producing a mineral-based layer, comprising
  mixing water, magnesium oxide, magnesium chloride or magnesium sulphate with a filler component to form a slurry;
  adding a polymer compound to said slurry;
  drying the slurry to form a layer.

ITEM 48. The method according to item 47, wherein in the filler component comprises Perlite, Sand, Talc, Fly ash, Calcium Carbonate or combinations thereof.

ITEM 49. The method according to any one of the preceding items 47 or 48, further comprising a step of adding a de-foaming agent, a dispersing agent, an anti-corrosion agent, a water resistance additive.

ITEM 50. The method according to any one of the preceding items 47 to 49, wherein the polymer compound is present in the amount 1 to 15 wt %, more preferably 5 to 10 wt % of the mineral-based layer.

ITEM 51. The method according to any one of the preceding items 47 to 50, wherein the polymer compound comprises Acrylic, Styrene-Acrylic, Vinyl-acetate, Vinyl-Acetate-vinylchloride Styrene-Butadiene, vinylidene chloride or combinations thereof.

ITEM 52. The method according to any one of the preceding items 47 to 51, wherein the polymer compound is added in the form of a powder or a dispersion.

ITEM 53. The method according to any one of the preceding items 47 to 52, wherein the polymer compound is added in the form of a dispersion, wherein the pH-value of the polymer dispersion is pH 7 or more.

ITEM 54. The method according to any one of the preceding items 47 to 53, further comprising the step of adding reinforcement fibres comprising reinforcement fibres according to any one of items 2 to 14.

ITEM 55. Use of a polymer compound 60, such as a polymer compound according to any one of items 16 to 22, in a mineral-based layer 3, 5, 6 of a building panel 10, such as a floor panel.

ITEM 56. Use of reinforcement fibres 50, such as according to any one of items 2 to 15, in a mineral-based layer 3, 5, 6 of a building panel 10, such as a floor panel.

The invention claimed is:

1. A panel comprising a core, an upper arrangement and a lower arrangement, wherein one or more of the core, the upper arrangement and the lower arrangement comprises a mineral-based layer, wherein the mineral-based layer further comprises a polymer compound and magnesium oxide in the amount of 25 to 65 wt %, wherein the panel is a floor panel comprising a front side and a rear side, wherein the front side is a visible side,
  wherein the polymer compound comprises Acrylic, Styrene-Acrylic, Vinyl-acetate, Vinyl-Acetate-vinylchloride, Styrene-Butadiene, vinylidene chloride or combinations thereof, and
  wherein the polymer compound has a glass transition temperature, the glass transition temperature of the polymer compound being in the range of −50 to 30 C°.

2. The panel according to claim 1, wherein the mineral-based layer comprises the polymer compound in an amount of 1 to 15 wt %.

3. The panel according to claim 1, wherein the mineral-based layer further comprises magnesium chloride and/or magnesium sulphate.

4. The panel according to claim 1, wherein the mineral-based layer further comprises at least one filler, in an amount of 0 to 50 wt %.

5. The panel according to claim 1, wherein the mineral-based layer further comprises a binding agent, in an amount of 0 to 30 wt %.

6. The panel according to claim 1, wherein the mineral-based layer further comprises at least one additive, in an amount of 0 to 20 wt %.

7. The panel according to claim 1, wherein one or more of said mineral-based layers comprises reinforcement fibres embedded in a mineral-based matrix, wherein the fibres are configured to increase the tensile strength of the mineral-based layer.

8. The panel according to claim 1, wherein the panel comprises a mechanical locking system at respective opposite first and second edges for assembling a first panel in an assembled position with an adjacent second panel by means of a folding displacement F and/or a vertical displacement of the adjacent panels; wherein immediately juxtaposed upper edge portions of the first edge of the first panel and the second edge of the second panel in the assembled position form a vertical plane; the first edge comprising a locking strip projecting beyond the vertical plane and a locking element projecting from the locking strip; the second edge comprising a downwards open locking groove configured to receive the locking element by means of said displacement for horizontal locking of the adjacent panels, wherein a first pair of horizontal locking surfaces comprises a first locking surface provided by the locking element and a second locking surface provided by the locking groove.

9. The panel according to claim 1, wherein the mineral-based layer further comprises a binding agent, in an amount of 5 to 25 wt %, wherein the binding agent is wood shavings or wood fibres.

10. The panel according to claim 1, wherein the core is the mineral-based layer.

11. The panel according to claim 1, wherein the mineral-based layer comprises the polymer compound in an amount of 5 to 15 wt %.

12. The panel according to claim 1, wherein the mineral-based layer comprises the polymer compound in an amount of 5 to 10 wt %.

13. The panel according to claim 12, wherein the glass transition temperature of the polymer compound is in the range of −10 to 20° C.

14. The panel according to claim 1, wherein the glass transition temperature of the polymer compound is in the range of −10 to 20° C.

15. A panel comprising a core, wherein the core comprises a mineral-based layer, wherein the mineral-based layer further comprises a polymer compound and magnesium oxide in the amount of 25 to 65 wt %, wherein the panel is a floor panel comprising a front side and a rear side, wherein the front side is a visible side, wherein the polymer compound comprises Acrylic, Styrene-Acrylic, Vinyl-acetate, Vinyl-Acetate-vinylchloride, Styrene-Butadiene, vinylidene chloride or combinations thereof, and wherein the polymer compound has a glass transition temperature, the glass transition temperature of the polymer compound being in the range of −50 to 30 C°.

16. The panel according to claim 15, wherein the mineral-based layer further comprises a binding agent, in an amount of 5 to 25 wt %.

17. The panel according to claim 15, wherein the mineral-based layer comprises the polymer compound in an amount of 1 to 15 wt %.

18. The panel according to claim 15, wherein the mineral-based layer further comprises magnesium chloride and/or magnesium sulphate.

19. The panel according to claim 15, wherein the mineral-based layer further comprises at least one filler, in an amount of 0 to 50 wt %.

20. The panel according to claim 15, wherein the mineral-based layer further comprises a binding agent, in an amount of 0 to 30 wt %.

21. The panel according to claim 15, wherein the mineral-based layer further comprises at least one additive, in an amount of 0 to 20 wt %.

22. The panel according to claim 15, wherein one or more of said mineral-based layers comprises reinforcement fibres embedded in a mineral-based matrix, wherein the fibres are configured to increase the tensile strength of the mineral-based layer.

23. The panel according to claim 15, wherein the panel comprises a mechanical locking system at respective opposite first and second edges for assembling a first panel in an assembled position with an adjacent second panel by means of a folding displacement F and/or a vertical displacement of the adjacent panels; wherein immediately juxtaposed upper edge portions of the first edge of the first panel and the second edge of the second panel in the assembled position form a vertical plane; the first edge comprising a locking strip projecting beyond the vertical plane and a locking element projecting from the locking strip; the second edge comprising a downwards open locking groove configured to receive the locking element by means of said displacement for horizontal locking of the adjacent panels, wherein a first pair of horizontal locking surfaces comprises a first locking surface provided by the locking element and a second locking surface provided by the locking groove.

24. The panel according to claim 15, wherein the mineral-based layer comprises the polymer compound in an amount of 5 to 15 wt %.

25. The panel according to claim 15, wherein the mineral-based layer comprises the polymer compound in an amount of 5 to 10 wt %.

26. The panel according to claim 25, wherein the glass transition temperature of the polymer compound is in the range of −10 to 20° C.

27. The panel according to claim 15, wherein the glass transition temperature of the polymer compound is in the range of −10 to 20° C.

* * * * *